US006475714B2

(12) United States Patent
Arimoto et al.

(10) Patent No.: US 6,475,714 B2
(45) Date of Patent: Nov. 5, 2002

(54) IMAGE FORMING MATERIAL

(75) Inventors: Tadashi Arimoto; Takayuki Sasaki; Eiichi Ueda; Yasuo Kurachi, all of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/798,607

(22) Filed: Mar. 2, 2001

(65) Prior Publication Data

US 2002/0015925 A1 Feb. 7, 2002

(30) Foreign Application Priority Data

Mar. 6, 2000 (JP) ....................................... 2000-060301

(51) Int. Cl.$^{7}$ .......................... G03C 1/89; G03C 11/22; B32B 27/06; B32B 27/08; B32B 27/36

(52) U.S. Cl. ....................... 430/529; 430/527; 428/407; 428/483; 428/515; 428/519; 428/520

(58) Field of Search ................................ 430/527, 528, 430/529; 428/407, 483, 515, 519, 520

(56) References Cited

U.S. PATENT DOCUMENTS 4,225,665 A * 9/1980 Schadt ....................... 430/529
5,079,136 A * 1/1992 Tachibana et al. .......... 430/529
5,098,822 A * 3/1992 Tachibana et al. .......... 430/529
5,284,741 A * 2/1994 Tachiana et al. ............ 430/529

FOREIGN PATENT DOCUMENTS

| | | |
|---|---|---|
| JP | 49-12523 | 2/1974 |
| JP | 49-91165 | 8/1974 |
| JP | 63-55541 | 3/1988 |
| JP | 63-148254 | 6/1988 |
| JP | 63-148256 | 6/1988 |
| JP | 1-134191 | 5/1989 |
| JP | 2-9689 | 1/1990 |
| JP | 2-182491 | 7/1990 |
| JP | 8-134148 | 5/1996 |

* cited by examiner

*Primary Examiner*—Richard L. Schilling
(74) *Attorney, Agent, or Firm*—Frishauf, Holtz, Goodman, & Chick, P.C.

(57) ABSTRACT

An image forming material comprising a support is disclosed. The support has, on at least one surface, a sublayer comprised of a styrenes-diolefin based copolymer, thereon an antistatic layer comprised of an electrically conductive composition prepared by mixing polymer particles having a functional group on the side chain with a water-soluble polymer, which interacts with said functional group, and thermally treating the resulting mixture at 50 to 90° C., and further having, on said antistatic layer, a layer comprised of a hydrophilic resin.

17 Claims, No Drawings

IMAGE FORMING MATERIAL

FIELD OF THE INVENTION

The present invention relates to an image forming material, such as a silver halide light-sensitive photographic material which exhibits excellent adhesion properties, abrasion resistance and cracking resistance of the silver halide emulsion layer and the hydrophilic polymer layer and also exhibits excellent antistatic properties after photographic processing.

BACKGROUND OF THE INVENTION

Heretofore, carried out as an antistatic means for resinous products, fibers, and the like, has been covering the surface of materials employing electrically conductive compositions. Most of such electrically conductive compositions are prepared by dispersing or dissolving metals, metal oxides, carbon black, ionic polymers, surface active agents, and the like, together with binders in organic solvents. Thus coating has been carried out utilizing organic solvents. In recent years, however, it has tended to be that from the aspect of environmental protection, release of organic solvent to the atmosphere is not tolerated. As a result, demanded has been development of coating methods employing water. However, at present, an electrically conductive layer formed by employing compositions comprised of water generally exhibits low water resistance.

Silver halide light-sensitive photographic materials generally comprise an electrically insulating support having thereon coated layers comprised of silver halide emulsion layers and the like. As a result, during their production, as well as during their use, when being subjected to friction upon coming into contact with other materials or to peeling, they tend to be electrostatically charged. Accumulated electrostatic charge results in critical problems with image forming materials during its electric discharge. Further, even though image forming materials comprise electrically conductive materials, they may be dissolved in water during water based photographic processing, or the conductivity may be degraded during water based processing. Thus image forming materials after photographic processing tend to be more readily charged, resulting in being readily attracting dirt and dust. As a result, the formation of unnecessary spots on finished prints due to shielding materials, such as dirt, dust and the like, results in a decrease in product value. Specifically, in medical light-sensitive materials, the formation of spots may result in misdiagnosis, which endangers people's lives. During handling such film, electrostatic shock formed by electrostatically charged film, may result in reluctance to workers to handle it. Such electrostatic problems tend to occur due to the current situations such as the quality enhancement of silver halide photographic materials, the increase in their productivity, the high speed automatic processing and the like, wherein electrostatic charge tends to be generated. Accordingly, it has become increasingly important to take counter measures. Image forming materials, when the light-sensitive layers are applied, frequently come into contact with rolls. They tend to be charged every time when they are separated from each roll. Thus, light-sensitive layer coating compositions and the like tend to be non-uniformly coated and occasionally result in coating mottle.

Heretofore, in order to overcome these problems, various antistatic techniques have been proposed. For example, Japanese Patent Publication Open to Public Inspection Nos. 49-91165 and 49-12523 disclose compounds which have an ionic group in their polymer primary chain. In addition to said compounds, known are electrically conductive polymers described in Japanese Patent Publication Open to Public Inspection Nos. 2-9689 and 2-182491, surface active agents described in Japanese Patent Publication Open to Public Inspection Nos. 63-55541, 63-148254, 63-148256, and 1-134191, and the like. However, in most cases, said antistatic performance is markedly degraded after photographic processing.

Japanese Patent Publication Open to Public Inspection No. 8-134148 discloses a technique in which monomers having a polymerizable functional group undergo emulsion polymerization in a water based solvent comprising a water-soluble polymer having a sulfonic group as well as a carboxylic acid group, and further, Japanese Patent Publication Open to Public Inspection No. discloses a silver halide light-sensitive photographic material utilizing the resulting compounds. However, the electrical conductivity of the antistatic layer obtained by coating, and subsequently drying, is markedly degraded while being processed employing water, and consequently exhibits insufficient water resistance.

Furthermore, recent image forming materials tend to exhibit insufficient adhesion properties of the constituted layers, as well as insufficient abrasion resistance due to the enhancement of functions, the increase in productivity, high speed automatic processing, and the like, and also tend to result in the formation of curl. Heretofore, in order to minimize curl due to the elongation and shrinkage of gelatin employed in image forming materials, as well as to prevent cracking of silver halide emulsion layers comprising silver halide grains, techniques have been known in which plasticizers such as, for example polymer latexes, are added to the gelatin layer. However, in the recent quick processing of image forming materials, film is more rapidly conveyed. As a result, it has become extremely difficult to improve the physical properties of film to the desired level only by utilizing conventional techniques. Thus improved techniques have been demanded.

SUMMRY OF THE INVENTION

From the view of the foregoing, the present invention has been accomplished. An object of the present invention is to provide an image forming material, particularly, a light-sensitive photographic material which comprises a light sensitive layer and a hydrophilic polymer layer, which exhibit excellent adhesion properties, abrasion resistance, curl minimizing properties, and cracking resistance and also comprises an antistatic layer in which antistatic properties are not degraded after processing.

The inventors of the present invention have discovered that the object of the present invention is achieved by providing the specified sublayer on a support, and then providing thereon an antistatic layer comprised of the electrically conductive composition obtained by mixing polymer particles having a functional group which interact with a water-soluble polymer with said water-soluble polymer, and subsequently thermally treating the resultant mixture. Heretofore, the electrically conductive compositions, which are employed to form an antistatic layer, have been utilized without heating. However, it has been found that after processing, antistatic effects, layer adhesion, abrasion resistance, and cracking resistance are degraded. In order to overcome these drawbacks, said inventors have conducted diligently investigation. As a result, it has been discovered that said drawbacks are effectively overcome by carrying out thermal treatment. The present invention is characterized in that as described above, by carrying out such thermal treatment, properties as described above are exhibited due to the newly discovered action in a layer of polymer particles having a functional group on the side chain due to an unidentified interaction of said functional group with a water-soluble polymer.

The summary of the present invention will now be described.

1. An image forming material comprising a support having sublayer on at least one surface of said support, wherein the image forming material has on the sublayer an antistatic layer comprised of an electrically conductive composition obtained by mixing polymer particles having a functional group on the side chain with a water soluble polymer which reacts with the functional group, and subsequently heating the resulting mixture at 50 to 90° C., and further has on said antistatic layer a layer comprised of a hydrophilic resin.

2. The image forming material of item 1, wherein the sublayer comprises a styrene-diolefin based copolymer, a vinylidene chloride based copolymer, a copolymer having an active methylene group, or two types of acryl based polymer latexes in which one polymer has a lower glass transition point (TgL) and the other has a higher glass transition point (TgH) and the difference in said glass transition points is 10 to 80° C., 3. The image forming material of claim 1, wherein the structure of polymer which forms polymer particles having a functional group on the side chain, is represented by Formula (I):

Formula (I)

$$-(A)_x-(B)_y-(C)_z-$$

wherein A represents ethylenically unsaturated monomer having a functional group which is reactive with water-soluble polymer selected from the group consisting of an active ethylene group, a glycidyl group, a hydroxyl group, a carboxyl group or salts thereof;

B represents a monomer unit that forms a homopolymer having a glass transition point of not more than 35 ° C. and being insoluble in water;

C represents an ethylenically unsaturated monomer other than A and B; and x, y, and z each represent percent by weight of the polymer satisfying $10 \leqq x \leqq 60$, $5 \leqq y \leqq 90$, and $x+y+z=100$.

4. The image forming material of item 3, wherein the monomer represented by B is selected from the group consisting of methyl acrylate, ethyl acrylate, propyl acrylate, n-butyl acrylate, t-butyl acrylate, nonyl acrylate, 2-ethylhexyl acrylate, dodecyl acrylate, n-butyl methacrylate, pentyl methacrylate, n-hexyl methacrylate, n-octyl methacrylate, 2-ethylhexyl methacrylate, i-nonyl methacrylate, n-dodecyl methacrylate, phenethyl methacrylate, methyl maleate, vinyl acetate, vinyl propionate, vinyl butyrate, vinyl valerate, butadiene, isoprene, and chloroprene.

5. The image forming material of item 4, wherein the monomer represented by B is selected from the group consisting of ethyl acrylate, propyl acrylate, n-butyl acrylate, 2-ethylhexyl acrylate, butadiene, and isoprene.

6. The image forming material of item 1, wherein the water-soluble polymer is a water-soluble polymer comprising sulfonic acid group or carboxylic group.

7. The image forming material of any one of preceding items, wherein the water-soluble polymer is represented by Formula (II):

Formula (II)

$$-(D)_a-(E)_b-(F)_c-$$

wherein D represents a repeating unit of an ethylenically unsaturated monomer having a sulfonic acid group on a side chain; E represents a repeating unit of an ethylenically unsaturated monomer having a carboxylic acid group; F represents a repeating unit of an ethylenically unsaturated monomer other than D and E; and a, b, and c each represent percent by weight of each unit, satisfying $10 \leqq a \leqq 90$, $10 \leqq b \leqq 90$, and $a+b+c=100$.

8. The image forming material of item 7, wherein D is selected from the group consisting of styrenesulfonic acid, vinylbenzylsulfonic acid, vinylsulfonic acid, acryloyloxymethylsulfonic acid, acryloyloxyethylsulfonic acid, acryloyloxypropylsulfonic acid, methacryloyloxymethylsulfonic acid, methacryloyloxyethylsulfonic acid, methacryloyloxypropylsulfonic acid, 2-acrylamido-2-methylethanesulfonic acid, 2-acrylamido-2-methylpropanesulfonic acid, 2-acrylamido-2-methylbutanesulfonic acid, 2-ethacrylamido-2-methylethnaesulfonic acid, 2-ethacrylamido-2-methylpropanesulfonic acid, 2-ethacrylamido-2-methylbutanesulfonic acid, 2-methacrylamido-2-methylethnaesulfonic acid, 2-methacrylamido-2-methylpropanesulfonic acid, and 2-methacrylamido-2-methylbutanesulfonic acid, and their salt of alkaline metal ion ammonium ions.

9. The image forming material of item 7, wherein D is styrenesulfonic acid, butadiene having a sulfonic acid at the 4-position, and butadiene having a methyl group at the 3-position and a sulfonic group at the 4-position, and their salts.

10. The image forming material of item 7, wherein E is selected from the group consisting of acrylic acid, methacrylic acid, itaconic acid, maleic acid, and their salts of alkaline metal ion or ammonium ion.

11. The image forming material of any one of preceding items, wherein in Formula (I) the monomer represented by B is selected from the group consisting of ethyl acrylate, propyl acrylate, n-butyl acrylate, 2-ethylhexyl acrylate, butadiene, and isoprene; and x and y satisfies $50 \leqq x+y \leqq 100$; in Formula (II) D is styrenesulfonic acid, butadiene having a sulfonic acid at the 4-position, and butadiene having a methyl group at the 3-position and a sulfonic group at the 4-position, and their salts; and E is selected from the group consisting of acrylic acid, methacrylic acid, itaconic acid, maleic acid, and their salts of alkaline metal ion or ammonium ion; and a, b and c satisfies $10 \leqq a \leqq 90$, $10 \leqq b \leqq 90$, and $a+b+c=100$.

12. The image forming material of any one of preceding items, wherein an average particle diameter of the polymer particles having the functional group is between 0.03 and 10 $\mu$m.

13. The image forming material of any one of preceding items, wherein the hydrophilic layer comprises silver halide grains.

14. The image forming material of any one of preceding items, wherein the electrically conductive composition is obtained by thermally processing polymer particles having a functional group on the side chain with a water soluble polymer which reacts with the functional group with mixing at 50 to 90° C. for 10 minutes to 6 hours.

15. The image forming material of any one of preceding items, wherein ratio of the water-soluble polymer is mixed with the polymer particles of 0.1 to 10 in terms of weight ratio of solid component.

The other embodiment of the invention is described.

(1) An image forming material which comprises a support having on at least one surface of said support a sublayer comprised of a styrene-diolefin based copolymer, having on said sublayer an antistatic layer comprised of an electrically conductive composition obtained by mixing polymer particles having a functional group on the side chain with a water soluble polymer which interacts with said functional group, and subsequently heating the resulting mixture at 50 to 90° C., and further having on said antistatic layer a layer comprised of a hydrophilic resin.

(2) An image forming material which comprises a support having on at least one surface of said support a sublayer comprised of a vinylidene chloride based copolymer, having on said sublayer an antistatic layer comprised of an electrically conductive composition obtained by mixing polymer particles having a functional group on the side chain with a water soluble polymer which interacts with said functional group, and subsequently heating the resulting mixture at 50 to 90° C., and further having on said antistatic layer a layer comprised of a hydrophilic resin.

(3) An image forming material which comprises a support having on at least one surface of said support a sublayer comprised of a copolymer having an active methylene group, having on said sublayer an antistatic layer comprised of an electrically conductive composition obtained by mixing polymer particles having a functional group on the side chain with a water soluble polymer which interacts with said functional group, and subsequently heating the resulting mixture at 50 to 90° C., and further having on said antistatic layer a layer comprised of a hydrophilic resin.

(4) An image forming material which comprises a support having on at least one surface of said support a sublayer comprised of two types of acryl based polymer latexes, in which one polymer has a lower glass transition point (TgL) and the other has a higher glass transition point (TgH), and the difference in said glass transition points is 10 to 80° C., having on said sublayer an antistatic layer comprised of an electrically conductive composition obtained by mixing polymer particles having a functional group on the side chain with a water soluble polymer which interacts with said functional group, and subsequently heating the resulting mixture at 50 to 90° C., and further having on said antistatic layer a layer comprised of a hydrophilic resin.

(5) An image forming material which comprises a support having on at least one surface of said support a sublayer comprised of a composition containing an organic solvent capable of dissolving or swelling said support, together with a hydrophilic polymer, having on said sublayer an antistatic layer comprised of an electrically conductive composition obtained by mixing polymer particles having a functional group on the side chain with a water soluble polymer which interacts with said functional group and subsequently heating the resulting mixture at 50 to 90° C., and further having on said antistatic layer a layer comprised of a hydrophilic resin.

DETAILED DESCRIPTION OF THE INVENTION

The water-soluble polymer of the present invention and polymer particles having a functional group on the side chain, which interact with said polymer, are mixed in water and the resulting water-based composition is thermally treated. By employing said thermally treated composition, a consistent antistatic layer is formed. The interaction which is generated by said polymer particles having a functional group, which results in interactions with said water-soluble polymer, is not well understood. Though some functional groups are reactive, the present inventors assume that said interaction is due to an unidentified intermolecular attractive force, such as a dipole-dipole attractive force, an ionic attractive force and the like.

The structure of polymers, which form polymer particles having a functional group on the side chain, is represented by General Formula (I) described below:

General Formula (I)

$$—(A)_x—(B)_y—(C)_z—$$

wherein A represents an ethylenically unsaturated monomer (examples are described later) having a functional group which is interactive with water-soluble polymers (for example, an active methylene group, a glycidyl group, a hydroxyl group, a carboxyl group or salts thereof). B represents a monomer unit, which monomer forms such homopolymer as having a glass transition point (hereinafter occasionally referred to as Tg) of not more than 35° C. and preferably not less than −100° C., and being insoluble in water. The example of the monomer represented by B includes, for example, acrylates such as methyl acrylate, ethyl acrylate, propyl acrylate, n-butyl acrylate, t-butyl acrylate, nonyl acrylate, 2-ethylhexyl acrylate, dodecyl acrylate, n-butyl methacrylate, pentyl methacrylate, n-hexyl methacrylate, n-octyl methacrylate, 2-ethylhexyl methacrylate, i-nonyl methacrylate, n-dodecyl methacrylate, phenethyl methacrylate, methyl maleate; vinyl esters such as vinyl acetate, vinyl propionate, vinyl butyrate, vinyl valerate, and the like; diolefins such as butadiene, isoprene, chloroprene, and the like, and C represents an ethylenically unsaturated monomer. Further, x, y, and z each represent the percent by weight of a polymer. Generally, $10 \leqq x \leqq 60$, $5 \leqq y \leqq 90$, and x+y+x=100, and preferably $50 \leqq x+y \leqq 100$.

Examples of monomer component of A are shown below.

| | |
|---|---|
| MN-1 | 2-acetoacetoxyethylmethacrylate |
| MN-2 | 2-acetoacetoxyethylacrylate |
| MN-3 | 3-acetoacetoxypropylmethacrylate |
| MN-4 | 3-acetoacetoxypropylacrylate |
| MN-5 | 2-acetoacetoamidoethylmethacrylate |
| MN-6 | 2-acetoacetoamidoethylacrylate |
| MN-7 | 2-cyanoacetoxyethylmethacrylate |
| MN-8 | 2-cyanoacetoxyethylacrylate |
| MN-9 | N-(2-cyanoacetoxyethyl)acrylamide |
| MN-10 | 2-propionylacetoxyethylacrylate |
| MN-11 | N-(2-propionylacetoxyethyl)methacrylamide |
| MN-12 | N-4-(acetoacetoxybenzyl)phenylacrylamide |
| MN-13 | ethylacryloylacetate |
| MN-14 | methylacryloylacetate |
| MN-15 | N-methacryloyloxymethylacetoacetoamide |
| MN-16 | ethylmethacryloylacetate |
| MN-17 | N-arylcyanoacetoamide |
| MN-18 | N-(2-methacryloyloxyethyl)cyanoacetoamide |
| MN-19 | p-(2-acetoacetyl)ethylstyrene |
| MN-20 | 4-acetoacetyl-1-methacryloylpiperazine |
| MN-21 | N-butyl-N-acryloyloxyethylacetoacetoamide |
| MN-22 | p-(2-acetoacetoxy)ethylstyrene MN-23 |
| MN-23 | glycidylacrylate |
| MN-24 | glycidylmethacrylate |
| MN-25 | 2-hydroxyethylacrylate |
| MN-26 | 2-hydroxyethylmethacrylate |
| MN-27 | 2-propylacrylate |
| MN-28 | 2-propylmethacrylate |
| MN-29 | acrylic acid or its salt |
| MN-30 | methacrylic acid or its salt |
| MN-31 | maleic acid or its salt |

Monomer represented by B in the formula is preferably one having Tg of not more than 10° C., for example, ethylacrylate, propylacrylate, 2-etylhexylacrylate, butadiene and isoprene.

Values of glass transition temperature of the above-mentioned polymers are described in "Polymer Handbook", the third edition, edited by J. Brandrup and E. H. Immergut (John Wily & Sons. 1989) on pages VI/209 to VI/277.

The repetition unit represented by C of Formula (1) represents the repetition unit other than A and B, that is, the repetition unit derived from the monomer from which is obtained single polymer through polymerization of which glass transition temperature is more than 35° C.

Exemplarily, the monomer represents acrylic acid ester derivative (for example, t-butylacrylate, phenylacrylate, 2-naphthylacrylate, etc.), methacrylic acid ester derivative (for example, methylmethacrylate, ethylmethacrylate, 2-hydroxyethylmethacrylate, benzylmethacrylate, 2-hydroxypropylmethacrylate, phenylmethacrylate, cyclohexylmethacrylate, cresylmethacrylate, 4-chlorobenzylmethacrylate, ethyleneglycoldimethacrylate, etc.), vinyl ester derivative (for example, vinylbenzoate, pivaloyloxyethylene, etc.), acrylamide derivative (for example, acrylamide, methylacrylamide, ethylacrylamide, propylacrylamide, butylacrylamide, tert-butylacrylamide, cyclohexylacrylamide, benzylacrylamide, hydroxymethylacrylamide, methoxyethylacrylamide, dimethylaminoethylacrylamide, phenylacrylamide, dimethylacrylamide, diethylacrylamide, β-cyanoethylacrylamide, diacetoneacrylamide, etc.), methacrylamide derivative (for example, methacrylamide, methylmethacrylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacrylamide, dimethylaminoethylmethacrylamide, phenylmethacrylamide, dimethylmethacrylamide, diethylmethacrylamide, β-cyanoethylmethacrylamide, etc.), styrene derivative (for example, styrene, methylstyrene, dimethylstyrene, trimethylstyrene, ethylstyrene, isopropylstyrene, methoxystyrene, acetoxystyrene, chlorostyrene, dichlorostyrene, bromostyrene, vinylbenzoic acid methyl ester, etc.), divinylbenzene, acrylonitrile, methacrylonitrile, N-vinylpyrrolidone, N-vinyloxazolidone, vinylidene chloride, phenylvinylketone, etc.

Methylmethacrylate, ethylmethacrylate, styrene and cyclohexylmethacrylate are preferable among above since they are easily composed of copolymer.

Listed as preparation methods of polymer particles having a functional group on the side chain, which is interactive with the water-soluble polymers in accordance with the present invention, may be an emulsion polymerization method utilizing polymerization initiators, surface active agents, dispersion stabilizers, and the like, and a suspension polymerization method. Listed further is a method in which, after dissolving resins in solvents, the resultant solution is dispersed into a water based solution employing surface active agents and the like, and after removing the solvents, fine particles are formed. Of these, in the present invention, the emulsion polymerization method is preferred which effectively reaches the target particle size.

Polymerization reaction is usually carried out using 0.05 to 5 wt % of the radical polymerization initiator to the monomers which should be polymerized, and using 0.1 to 10 wt % of an emulsifying agent according to necessity.

As polymerization initiators, are cited exemplarily, potassium persulfate, ammonium persulfate, tert-butylperoctate, benzoylperoxide, iso-propylcarbonate, 2,4-dichlorobenzylperoxide, methylethylketoneperoxide, cumenehydroperoxide, dicumylperoxide, azobisbutyronitrile, sodium 2,2'-azobis(2-ethylcarboxy) isobutylate, 2,2'-azobis(2-amidinopropane)hydrochloride, benzoylperoxide, hydrogen peroxide, or redox initiator which is combination of reducing agent such as $FeCl_2$, $Na_2S_2O_3$ or sodium hydrogen sulfite with those cited above.

Said polymer particles is preferably resin particles having a particle diameter between 0.03 and 10 μm, and preferably between 0.05 and 0.50 μm. The formation of fine particles is preferably carried out employing surface active agent containing water-soluble polymers and/or surface active agents.

The polymer particles have preferably number average molecular weight of 10,000 to 1,000,000.

Listed as anionic surface active agents in surface active agents may be sodium dodecylbenzenesulfonate, sodium dodecylsulfate, sodium 1-octyloxycarbonylmethanesulfonate, sodium dodecylnaphthalenesulfonate, sodium laureate, sulfosuccinic acid dilauryl ester-sodium, sodium p-octylphenoxypolyethylene oxide sulfate (for example, polyethylene oxide having an average degree of polymerization of 6), and the like. Listed as nonionic surface active agents may be polyoxyethylene nonyl phenyl ether, polyoxyethylene nonyl phenyl ether, polyoxyethylene dinonyl ether, polyoxyethylene sorbitan lauryl ester (for example, polyethylene oxide having an average degree of polymerization of 5 to 30), and the like. Listed as cationic surface active agents may be cetyltrimethylammonium chloride, dodecyltrimethylammonium chloride, N-2-ethylhexylpyridinium chloride, N,N-dimethyldodecylammonium sulfonate, tetramethylammonium chloride, trimethylbenzyl ammonium chloride, and the like. Listed as amphoteric surface active agents may be dimethyllaurylsulfopropylammoniumbetaine, and the like.

Employed as water-soluble polymers having surface active property may be almost all water-soluble natural polymers and water-soluble synthetic polymers having a water-soluble anionic group, a cationic group, or a nonionic group. As preferable anionic groups are carboxylic acid or salts thereof, sulfonic acid or salts thereof, and phosphoric acid or salts thereof. As preferable cationic groups are tertiary amines or alkyl ammonium salts. As preferable nonionic groups are a hydroxyl group, an amido group, a methoxy group, and as preferable alkyleneoxide group is an oxyethylene group, and as a preferable hetero atom ring is a pyrrolidone group. Of water-soluble synthetic polymers, those, which are either anionic or nonionic, are preferred, and anionic polymers are particularly preferred. More preferred polymers are those having a sulfonic acid salt and polymers comprising polystyrenesulfonic acid salts as well as conjugated diene based sulfonic acid salts are more preferred. Further, water-soluble polymers may be employed in combination of two or more types. Further, said water-soluble polymers may be the same as the water-soluble polymers which are thermally treated to prepare electrically conductive compositions which are employed as the constituting element of the present invention.

Water-soluble polymers having surface active property will now be exemplified.

SP-1

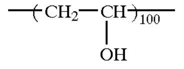

SP-2

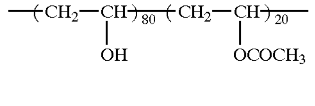

-continued
SP-3
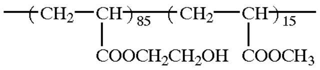
SP-4
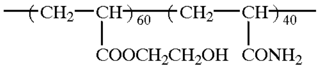
SP-5
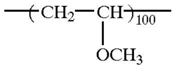
SP-6
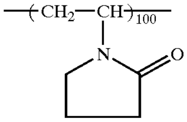
SP-7
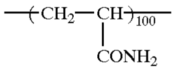
SP-8
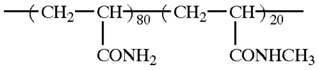
SP-9
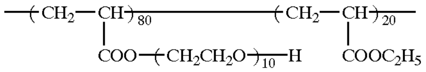
SP-10
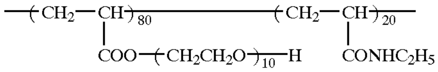
SP-11
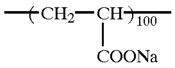
SP-12
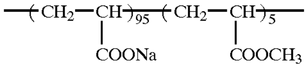
SP-13
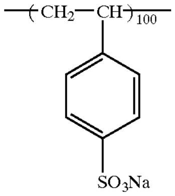
SP-14
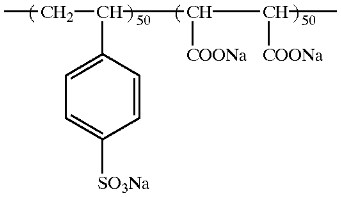
SP-15
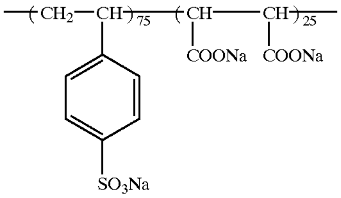
-continued
SP-16
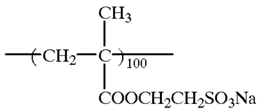
SP-17
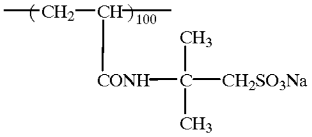
SP-18
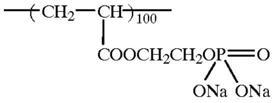
SP-19
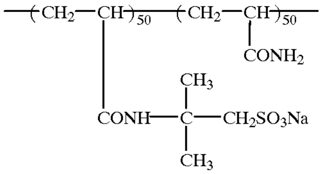
SP-20
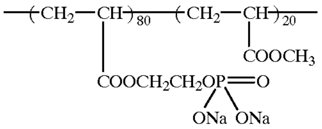
SP-21
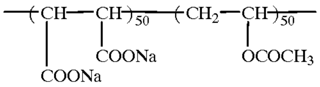
SP-22
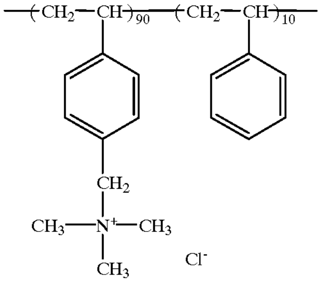
SP-23
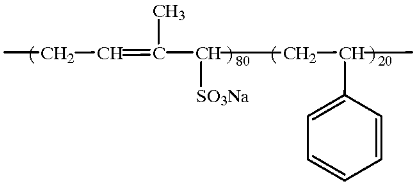
SP-24
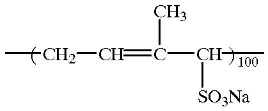
SP-25
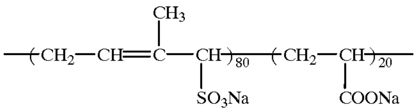

-continued

SP-26

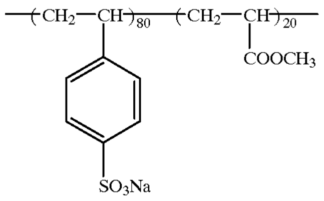

SP-27

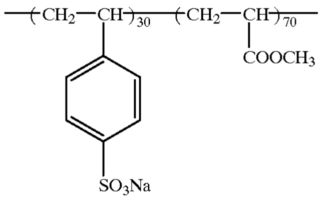

SP-28

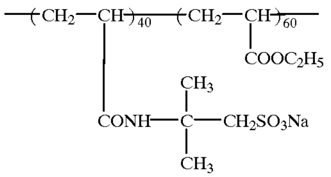

SP-29

Dextran sodium sulfate

SP-30

Dextran

-continued

SP-31

Sodium alginate

Examples of polymerization methods of the aforementioned polymer particles will now be described.

Polymerization of LX-1 (shown below)

Placed in a 1-liter 4-necked flask fitted with a stirrer, a thermometer, a dripping funnel, a nitrogen inlet pipe, and a reflux cooling device were 1.0 g of sodium dodecylbenzenesulfonate, 1.0 g of SP-23, and 350 ml of pure water. The resulting mixture was then heated to an interior temperature of 80° C., while introducing nitrogen gas. After the interior temperature reached 80° C., the nitrogen gas was introduced for additional 30 minutes. Thereafter, a solution prepared by dissolving 0.45 g of ammonium persulfate as the polymerization initiator in 100 ml of water was added. Subsequently, 40 g of MN-1, 20 g of BA, and 40 g of St were mixed, placed in a dripping funnel, and dripped over about one hour. The resulting reaction products were cooled 5 hours after the addition of said polymerization initiator, and the pH was then adjusted to 5, employing ammonia water. Thereafter, coarse particles were removed by filtration, whereby LX-1 was obtained.

In the same manner, LX-2 through LX-13 (shown below) were obtained. However, 1.0 g of SP-14 was further added to LX-11, while 1.0 g of SP-15 was further added to LX-13. Structures of fine copolymer particles synthesized as described above are illustrated below.

| | Compound Represented by A of General Formula (1) | | Compound Represented by B of General Formula (1) | | Compound Represented by C of General Formula (1) | | Protective Colloid Compound During Emulsion Polymerization (Water-soluble |
|---|---|---|---|---|---|---|---|
| Exemplified Compound | Compound Type | Weight Ratio | Compound Type | Weight Ratio | Compound Type | Weight Ratio | Polymer and/or Surface Active Agent) |
| Lx-1 | MN-1 | 0.4 | BA | 0.2 | St | 0.4 | SP-23, S-2 |
| Lx-2 | MN-1 | 0.6 | BA | 0.1 | St | 0.3 | SP-23, S-2 |
| Lx-3 | MN-1 | 0.2 | BA | 0.3 | St | 0.5 | SP-23, S-2 |
| Lx-4 | MN-1 | 0.4 | AIN | 0.3 | CHMA | 0.3 | SP-23, S-2 |
| Lx-5 | MN-1 | 0.4 | EA | 0.2 | MMA | 0.4 | SP-23, S-2 |
| Lx-6 | MN-1 | 0.4 | EA | 0.2 | St | 0.4 | SP-23, S-2 |
| Lx-7 | MN-1 | 0.4 | VAc | 0.4 | EMA | 0.4 | SP-23, S-2 |
| Lx-8 | MN-2 | 0.4 | BA | 0.2 | St | 0.4 | SP-23, S-2 |
| Lx-9 | MN-1 | 0.2 | BA | 0.3 | St | 0.3 | SP-23, S-2 |
| | GMA | 0.2 | | | | | |
| Lx-10 | MN-1 | 0.4 | AIN | 0.3 | St | 0.3 | SP-23, S-2 |
| Lx-12 | MN-1 | 0.4 | AIN | 0.3 | St | 0.3 | SP-1, S-2 |
| Lx-13 | MN-1 | 0.4 | AIN | 0.3 | St | 0.3 | SP-2, S-2 |
| Lx-14 | MN-1 | 0.4 | AIN | 0.3 | St | 0.3 | SP-6, S-2 |
| Lx-15 | MN-1 | 0.4 | AIN | 0.3 | St | 0.3 | SP-7, S-2 |
| Lx-16 | NN-1 | 0.4 | AIN | 0.3 | St | 0.3 | SP-8, S-2 |
| Lx-17 | MN-1 | 0.4 | AIN | 0.3 | St | 0.3 | SP-13, S-2 |
| Lx-18 | MN-1 | 0.4 | AIN | 0.3 | St | 0.3 | SP-26, S-2 |
| Lx-19 | MN-1 | 0.4 | AIN | 0.3 | St | 0.3 | SP-27, S-2 |
| Lx-20 | MN-1 | 0.4 | AIN | 0.3 | St | 0.3 | S-2 |
| Lx-21 | MN-1 | 0.4 | BA | 0.2 | St | 0.4 | S-1 |
| Lx-22 | MN-1 | 0.4 | BA | 0.55 | | | SP-23, S-2 |
| | GMA | 0.05 | | | | | |
| Lx-23 | GMA | 0.4 | BA | 0.2 | St | 0.4 | SP-23, S-2 |
| Lx-24 | GMA | 0.2 | BA | 0.3 | St | 0.5 | SP-23, S-2 |
| Lx-25 | GMA | 0.35 | BA | 0.2 | St | 0.35 | SP-23, S-2 |
| | MN-1 | 0.1 | | | | | |
| Lx-26 | GMA | 0.2 | BA | 0.2 | St | 0.4 | SP-23, S-2 |
| | MN-1 | 0.2 | | | | | |
| Lx-27 | MAA | 0.1 | BA | 0.2 | St | 0.4 | SP-23, S-2 |

-continued

| | Compound Represented by A of General Formula (1) | | Compound Represented by B of General Formula (1) | | Compound Represented by C of General Formula (1) | | Protective Colloid Compound During Emulsion Polymerization (Water-soluble |
|---|---|---|---|---|---|---|---|
| Exemplified Compound | Compound Type | Weight Ratio | Compound Type | Weight Ratio | Compound Type | Weight Ratio | Polymer and/or Surface Active Agent) |
| | MN-1 | 0.3 | | | | | |
| Lx-28 | HEMA | 0.2 | BA | 0.2 | St | 0.4 | SP-23, S-2 |
| | MN-1 | 0.2 | | | | | |
| Lx-29 | GMA | 0.2 | BA | 0.2 | St | 0.4 | SP-23, SP-14, S-2 |
| | | 0.2 | | | | | |
| Lx-30 | GMA | 0.4 | BA | 0.2 | St | 0.4 | SP-23, SP-14, S-2 |
| Lx-31 | GMA | 0.4 | BA | 0.2 | St | 0.4 | SP-23, SP-15, S-2 |
| Lx-32 | GMA | 0.2 | BA | 0.3 | St | 0.5 | SP-23, SP-15, S-2 |
| Lx-33 | MN1 | 0.1 | BA | 0.2 | St | 0.35 | SP-23, SP-15, S-2 |
| | GMA | 0.35 | | | | | |

*S-2 represents sodium dodecylbenzenesulfonate.
*The solids of the latex was 30 percent.
*The particle diameter of these latexes was between 0.07 and 0.4 μm.
*The employed amount of the water-soluble polymers during emulsion polymerization was between 10 and 100 percent with respect to the total amount of monomer components.

Water-soluble polymers which interact with a functional group of polymers which constitute the electrically conductive composition of the present invention will now be described. Said water-soluble polymers are soluble in an amount of at least 1 g per 100 g of water at 23° C. Said water-soluble polymers are not particularly limited as long as they interact with said polymer particles, which are employed together. Water-soluble polymers having a sulfonic acid group and a carboxylic acid group are preferred.

General Formula (II) described below represents structures of water-soluble polymers in accordance with the present invention.

General Formula (II)

$$-(D)_a-(E)_b-(F)_c-$$

wherein D represents the repeating unit of an ethylenically unsaturated monomer having a sulfonic acid group on the side chain, E represents the repeating unit of an ethylenically unsaturated monomer having a carboxylic acid group, and F represents the repeating unit of an ethylenically unsaturated monomer other than D and E. Further, a, b, and c each represent percent by weight of each unit in a water-soluble polymer. Said percent satisfies $10 \leqq a \leqq 90$, $10 \leqq b \leqq 90$, and $a+b+c=100$, and preferably satisfies $40 \leqq a \leqq 90$, $10 \leqq b \leqq 60$, and $c \leqq 20$.

Listed as monomers represented by D may be styrenesulfonic acid, vinylbenzylsulfonic acid, vinylsulfonic acid, acryloyloxymethylsulfonic acid, acryloyloxyethylsulfonic acid, acryloyloxypropylsulfonic acid, methacryloyloxymethylsulfonic acid, methacryloyloxyethylsulfonic acid, methacryloyloxypropylsulfonic acid, 2-acrylamido-2-methylethanesulfonic acid, 2-acrylamido-2-methylpropanesulfonic acid, 2- acrylamido-2-methylbutanesulfonic acid, 2-ethacrylamido-2-methylethnaesulfonic acid, 2-ethacrylamido-2-methylpropanesulfonic acid, 2-ethacrylamido-2-methylbutanesulfonic acid, 2-methacrylamido-2-methylethnaesulfonic acid, 2-methacrylamido-2-methylpropanesulfonic acid, 2-methacrylamido-2-methylbutanesulfonic acid, and the like. These sulfonic acids may be introduced into said water-soluble polymer by polymerizing the monomer having said sulfonic acids, or may be introduced after polymerization. These acids are preferably in the form of salts of alkaline metal ions (for example, $Na^+$, $K^+$, and the like) or ammonium ions.

Of these, listed as examples of preferred monomers may be styrenesulfonic acid, and butadiene which has a sulfonic acid at the 4-position, and have a methyl group at the 3-position, as well as a sulfonic group at the 4-position, and more preferred are those which form salts with cations.

The monomers represented by E are preferably those having a carboxylic acid. Listed as examples may be acrylic acid, methacrylic acid, itaconic acid, maleic acid, and the like. These acids are preferably in the form of salts of alkaline metal ions (for example, $Na^+$, $K^+$, and the like) or ammonium ions. Of these, acrylic acid as well as maleic acid is preferred.

Examples of monomers represented by F, other than those represented by D and E, are the same as those represented by said C.

Example of water-soluble polymers will now be illustrated.

ASP-1

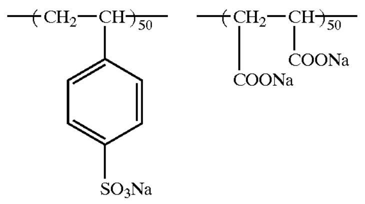

MW = 30,000

ASP-2

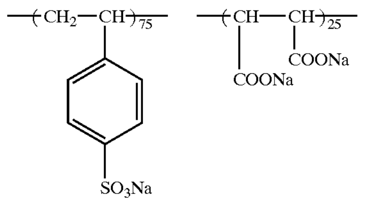

MW = 50,000

-continued

ASP-3

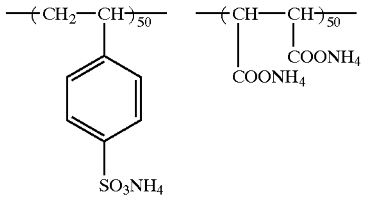

MW = 35,000

ASP-4

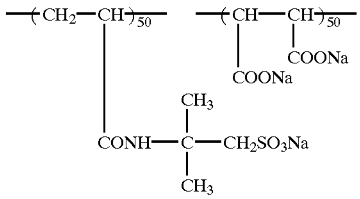

MW = 40,000

ASP-5

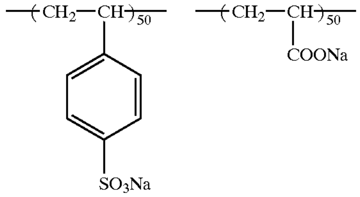

MW = 30,000

ASP-6

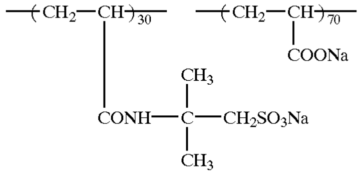

MW = 40,000

ASP-7

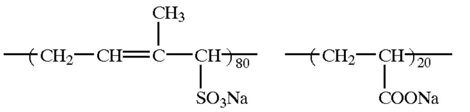

MW = 50,000

The electrically conductive compositions of the present invention will now be described.

It is possible to prepare an electrically conductive composition by mixing polymer particles having a functional group and water-soluble polymers in a water-based medium while maintaining the temperature at least 50° C. Namely, the temperature during mixing said polymer particles and a said water-soluble polymer is not particularly limited, and room temperature, or temperature higher than that, may be utilized. However, said electrically conductive composition is prepared by mixing said polymer particles and said water-soluble polymers while stirring at 50° C. or more until use as said composition.

Further, said polymer particles having a functional group in a polymer state may be mixed with said water-soluble polymers, while monomers, which result in fine polymer particle, may be added to said water soluble polymers and said monomers may be converted to polymer particles in the resulting mixed system.

After mixing, heating treatment is preferably carried out at 50° C. or more for at least 10 minutes, and is more preferably carried out at 60 to 90° C. for 10 minutes to 6 hours.

When treated at less than 50° C., the desired interaction is not exhibited. By contrast, when treated at 90° C. or higher, said thermal treatment tends to result in coagulation so that it is impossible to form electrically conductive compositions. Accordingly, the preferred thermal treatment, which forms the electrically conductive compositions of the present invention, is carried out so that polymer particles attract each other through interaction without forming coagulation. Mixing methods may be employed without any particular limitation as long as they are capable of uniformly mixing. Further, said thermal treatment is not particularly limited as long as it is carried out employing heating devices which can uniformly heat the water-based mixture. The mixing ratio of said polymer particles to said water-soluble polymer may be optionally set in the range in which the resulting coated layer exhibits the desired electrical conductivity range, as well as the desired layer strength. In terms of the weight ratio of solids, the ratio of said water-soluble polymer is between 0.1 and 10 per polymer particles, and is preferably between 0.5 and 3. After said thermal treatment, when stored at not more than 30° C., the resulting electrically conductive composition may be employed anytime as needed. Other than said polymer particles and said water-soluble polymers, if desired, also incorporated into said electrically conductive compositions may be additives, for example, surface active agents as well as viscosity controlling agents to enhance coatability, crosslinking agents to increase the layer strength, waxes to minimize abrasion marks, resins comprised of other components (for example, polymer emulsion and thermohardening resin particles other than the polymer particles of the present invention), fine inorganic particles, inorganic fillers, layer forming aids, plasticizers, dispersing agents, wetting agents, antifoaming agents, organic solvents and the like. Sum of the weight of the polymer particles and the water-soluble polymers is preferably 70 weight % or more in the electrically conductive compositions.

Electrically conductive compositions, which can be employed in the present invention, will now be exemplified.

| Electrically Conductive Composition | | | |
|---|---|---|---|
| Polymer particles Type (1) | Water-soluble Polymer (2) | Ratio of (1)/(2) by Weight | Heating Conditions |
| Lx-22 | ASP-2 | 1/2 | 70° C./1 hour |
| Lx-25 | ASP-2 | 1/2 | 70° C./1 hour |
| Lx-29 | ASP-2 | 1/2 | 70° C./1 hour |
| Lx-30 | ASP-2 | 1/2 | 70° C./1 hour |
| Lx-31 | ASP-2 | 1/2 | 70° C./1 hour |
| Lx-33 | ASP-2 | 1/2 | 70° C./1 hour |
| Lx-31 | ASP-1 | 1/2 | 70° C./1 hour |
| Lx-31 | ASP-4 | 1/2 | 70° C./1 hour |
| Lx-31 | ASP-6 | 1/2 | 70° C./1 hour |
| Lx-31 | ASP-2 | 1/1 | 70° C./1 hour |
| Lx-31 | ASP-2 | 2/1 | 70° C./1 hour |
| Lx-31 | ASP-2 | 1/3 | 70° C./1 hour |
| Lx-31 | ASP-2 | 1/2 | 70° C./1 hour |
| Lx-31 | ASP-2 | 1/2 | 60° C./30 min. |
| Lx-31 | ASP-2 | 1/2 | 55° C./15 min. |
| Lx-31 | ASP-2 | 1/2 | 45° C./10 min. |
| Lx-31 | ASP-2 | 1/2 | 60° C./5 min. |
| Lx-31 | ASP-2 | 1/2 | 23° C./23° C. |
| Lx-31 | ASP-2 | 1/2 | 95° C./2 hours |

The water based electrically conductive composition of the present invention is applied onto a support having thereon a sublayer, whereby an antistatic layer is formed on said sublayer. A hydrophilic resin containing layer, which is applied onto the antistatic layer of the present invention, exhibits excellent adhesive properties as well as excellent abrasion resistance. In addition, when said hydrophilic resin containing layer is comprised of a silver halide emulsion layer, it is possible to allow the entire layer to be provided with cracking resistance. It is also possible to allow the silver halide light-sensitive photographic material of the present invention to maintain electrical conductivity after photographic processing which is at the same level as that prior to said photographic processing. The surface resistivity, which expresses the electrical conductivity of the silver halide light-sensitive photographic material of the present invention, is in the range of not more than $10^{12}$ Ω·cm, and is preferably in the range of $10^{11}$ Ω·cm, under usual condition at 23° C. and 55% RH.

In order to further improve these properties of the silver halide light-sensitive photographic material of the present invention, it is preferable that a sublayer is provided between said antistatic layer and its support.

Preferably listed as supports, which relate to the present invention, may be polyester supports such as polyethylene terephthalate supports (hereinafter occasionally referred to as PET supports) and polyethylene naphthalate supports (hereinafter occasionally referred to as PEN supports), and syndiotactic polystyrene supports (hereinafter occasionally referred to as SPS supports), and the like, which exhibit dimensional stability under heat and moisture. All polyester components of said polyester supports may be comprised of PET. Modified polyesters may be employed which are comprised of mixed acids of terephthalic acid, naphthalene-2,6-dicarboxylic acid, isophthalic acid, butylenecarboxylic acid, 5-sodiumsulfoisophthalic acid, adipic acid and the like, as the acid components and mixed glycols of ethylene glycol, propylene glycol, butanediol, cyclohexanedimethanol, and the like, as the acid components. Further, polyesters may be employed which consist of 90 mole percent of polyester prepared by employing terephthalic acid with ethylene glycol or 2,6-naphthalenedicaroxylic acid with ethylene glycol and the other part of not more than 10 mole percent of said modified polyesters. It is possible to produce polyester film employing ordinary PET film casting methods. SPS, which is different from the conventional polystyrene (atactic polystyrene), possesses stereoregularity. The part having stereoregularity of SPS is a called racemo chain, and is preferred which has a part of regularity such as 2, 3, 5, or more chains. Regarding the racemo chains, the ratio of 2 chains is preferably at least 75 percent, the ratio of 3 chains is preferably at least 75 percent, the ration of 5 chains is preferably 50 percent, and the ratio of no less than 5 chains is preferably at least 30 percent. It is possible to polymerize SPS in accordance with the method described in Japanese Patent Publication Open to Public Inspection No. 3-131843.

In the present invention, after a support having a hydrophobic surface is subjected to surface treatment, an antistatic layer as well as a sublayer may be applied onto said treated surface. Surface treatments include a corona discharge treatment, a glow discharge treatment, a chemical treatment, a mechanical treatment, a flame treatment, an ultraviolet ray treatment, a high frequency treatment, an in-gas discharge plasma treatment, an active plasma treatment, a laser treatment, a mixed acid treatment, an ozone oxidation treatment, and the like. Of these, the corona discharge treatment as well as the glow discharge treatment is particularly preferred.

The corona discharge treatment is conducted according to the methods described in JP-B 48-5043 and 47-51905, JP-A 47-28067, 49-83767, 51-41770 and 51-131576. The discharge frequency is preferably 50 to 5,000 kHz, and more preferably 5 to 100 kHz. The treatment intensity to improve surface wettability is preferably 0.001 to 5 kV·A·min/$m^2$, and more preferably 0.01 to 1 kV·A·min/$m^2$. The gap clearance between an electrode and a dielectric roll is preferably 0.5 to 2.5 mm, and more preferably 1.0 to 2.0 mm.

The glow discharge treatment is described, for example, in U.S. Pat. Nos. 3,057,792, 3,057,795, 3,719,482, 3,288,638, 3,309,299, 3,424,735, 3,462,335, 3,475,307, and 3,761,299 and British Patent 997,093. Glow discharge is carried out under the condition at a pressure of 0.665 to 2660 Pa, and preferably 2.66 to 266 Pa. High voltage is applied between metal plates or metal bars in vacuum to induce discharge. The voltage is variable, depending of the composition of atmospheric gas or pressure. Stationary glow discharge is stably induced within the range of 500 to 5,000 V and the pressure range described above. The voltage suitable for enhancing adhesion is 2,000 to 4,000 V. The discharge frequency is from direct current to some thousands MHz, and preferably 50 to 20 MHz. The discharge treatment intensity to achieve desired adhesion performance is 0.01 to 5 kV·A·min/$m^2$, and more preferably 0.15 to 1 kV·A·min/$m^2$. With regard to the composition of discharging atmosphere gas, the partial pressure of water vapor is preferably 10 to 100%, and more preferably 40 to 90%. Gas other than water vapor is air comprised of nitrogen and oxygen. Quantitative introduction of water vapor into a glow-discharging atmosphere is achieved in such a manner that gas is introduced through tube provided in the glow discharge apparatus into quadrapole type mass spectrometer MSQ-6150 (available from Nippon Shinku Co. Ltd.) and further introduced to the discharging atmosphere, while quantitatively analyzing the gas composition. When the pre-heated support surface is subjected to the glow discharge treatment, enhancement of adhesive property is achieved by the treatment for a short period, markedly reducing yellowish-coloring of the support. In this case, the pre-heating temperature is preferably not lower than 50° C. and not higher than the glass transition temperature (Tg), more preferably not lower than 70° C. and not higher than Tg, and still more preferably not lower than 90° C. and not higher than Tg. The method for raising a polymeric surface temperature include, for example, heating by an infrared heater or heating by bringing into contact with a heated roller. The glow discharge treatment is conducted preferably in such a manner that plural pairs of opposed electrodes which have a refrigerant flow route in the intermediate portion are arranged in the lateral direction of the film support and the support is treated, while being transported. It is preferred that the treated support be immediately cooled using a cooled roller, as described in JP-A 3-39106.

The plasma discharge-in-gas treatment is conducted using an apparatus described in Japanese Patent Application No. 10-245151.

In the present invention, a sublayer may be applied on the surface which has been subjected to any of said surface treatments. Further, in the case of PET supports, a sublayer may be applied before or after uniaxial stretching, or before or after biaxial stretching during the casting stage. Employed as casting methods of polyester supports and subbing methods may be any of those which are conventionally known in the art. Methods, as described in paragraphs (0030) through (0070) of Japanese Patent Publication Open to Public Inspection No. 9-50094, can be preferably employed.

A sublayer applied onto a support, which is preferably adjacent to the support, will now be described. In the present invention, the application of a sublayer, comprised of components described below, improves adhesion properties, abrasion resistance and cracking resistance.

Listed as diolefin monomers, which form styrenes-diolefin based copolymers of the present invention may be conjugated dienes such as butadiene, isoprene, chloroprene, and the like; non-conjugated dienes such as 1,4-pentadiene, 1,4-hexadiene, 3-vinyl-1,5-hexadiene, 1,5-hexadiene, 3-methyl-1,5-hexadiene, 3,4-dimethyl-1,5-hexadiene, 1,2-divinylcyclobutane, 1,6-heptadiene, 3,5-diethyl-1,5-heptadiene, 4-cyclohexyl-1,6-heptadiene, 3-(4-pentenyl)-1-cyclopentane, 1,7-octadiene, 1,8-nonadiene, 1,9-decadiene, 1,9-octadecadiene, 1-cis-9-cis-1,2-octadecatriene, 1,10-undecadiene, 1,11-dodecadiene, 1,12-tridecadiene, 1,13-tetradecadiene, 1,14-pentadecadiene, 1,15-hexadecadiene, 1,17-octadecadiene, 1,21-docosadiene, and the like; cyclohexanediene, cyclobutanediene, cyclopentadiene, cyclohepadiene, and the like. Of these, butadiene, isoprene, and chloroprene are preferred, and butadiene is more preferred.

Further, styrenes, which are employed as other monomers which form styrens-diolefin based copolymers, include styrene and styrene derivatives. Listed as styrene derivatives may be, for example, methylstyrene, dimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid, vinylbenzoic acid methyl ester, divinylbenzene, and the like. Of these, styrene is preferred. Herein, the substitution position of an alkyl group, an alkoxy group, and a halogen atom of said styrene derivatives is any of the o, m, and p positions.

The content of diolefin monomers in styrens-diolefin based copolymers employed as sublayer components of the present invention is generally between 10 and 60 percent by weight with respect to the total copolymers, and is most preferably between 14 and 40 percent by weight, while the content of styrenes is preferably between 40 and 70 percent by weight with respect to the total copolymers. Further, said styrenes-diolefin based copolymers may comprise monomers comprising a third component. Listed as said third components may be, for example, acrylic acid esters or methacrylic acid esters (for example, methyl acrylate or methacrylate, ethyl acrylate or methacrylate, propyl acrylate or methacrylate, n-butyl acrylate or methacrylate, 2-ethylhexyl acrylate or methacrylate, cyclohexyl acrylate or methacrylate, phenyl acrylate or methacrylate, benzyl acrylate or methacrylate, phenethyl acrylate or methacrylate, 2-hydroxyethyl acrylate or methacrylate, 3-hydroxypropyl acrylate or methacrylate, 2,3-dihydroxypropyl acrylate or methacrylate, and the like); vinyl esters (for example, vinyl acetate, vinyl propionate, vinyl butyrate, vinyl isobutyrate, vinyl valerate, vinyl isovalerate, methyl ethyl vinyl acetate, vinyl pivaliate, vinyl caproate, vinyl isocaproate, vinyl trimethyl acetate, and the like); chlorine containing monomers such as vinyl chloride, vinylidene chloride, and the like; and the like. Any of these may be preferably incorporated. Further it is also possible to incorporate divinyl ether, divinylsulfone, diallyl phthalate, diallylcarbinol, diethylene glycol dimethacrylate, trimethylolpropane trimethacrylate, trimethylolpropane dimethacrylate, and the like.

These are prepared employing said polymerization method, and employing the same polymerization initiators, polymerization solvents, and emulsifiers (surface active agents). Styrenes-diolefin based copolymers in accordance with the present invention are preferably in a latex-like state obtained by the emulsion polymerization. Further, when cross-linkable monomers are employed, the ratio of the gel portion in said latex is preferably between 50 and 95 percent by weight. The gel portion ratio as described herein refers to the ratio of the portion by weight which is not dissolved in purified tetrahydrofuran at 20° C. for 48 hours.

The difference in the polymerization of said styrenes-diolefin based copolymers, from that of other polymers, is that said polymerization is carried out in a sealed pressure vessel.

Vinylidene chloride based latex, which is preferable example in view of coating characteristics, incorporated into the sublayer employed in the present invention comprises vinylidene chloride in an amount of 50 to 99.9 percent by weight. Therefore, preferred are those comprising vinyl based or acryl based monomers having a carboxyl group in an amount of 0.1 to 8 percent by weight, and further those comprising monomers of the third components. Listed as vinyl based or acryl based monomers which have a carboxyl group as the second component may be unsaturated organic acids such as acrylic acid, methacrylic acid, maleic anhydride, itaconic acid and the like, and salts thereof.

Vinylidene chloride based copolymers are preferably in the form of latexes prepared employing emulsion polymerization. Further, latexes may be employed which are comprised of core shell-like latex particles having different composition between their center and the portion surrounding the center.

The above-described copolymer employed in the subbing layer of the invention, i.e., polymer containing an active methylene group is preferably represented by the following formula (1):

Formula (1)

$$—(A)_x—(B)_y—(C)_z—$$

wherein A represents a repeating unit derived from an ethylenically unsaturated monomer containing an active methylene group and represented by formula (2) described below. B represents a repeating unit derived from an ethylenically unsaturated monomer selected from the group consisting of a methacrylic acid ester, acrylic acid ester and maleic acid ester; C represents a repeating unit derived from an ethylenically unsaturated monomer, except for A and B described above; x, y and z each are the proportion of each polymeric component, represent in terms of a percentage by weight, provided that $5 \leqq x \leqq 60$, $5 \leqq y \leqq 90$ and $x+y+z=100$.

Formula (2)

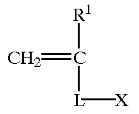

wherein $R^1$ represents a hydrogen atom, an alkyl group having 1 to 4 carbon atoms or a halogen atom; L represents a single bond or a bivalent linkage group, such as one represented by the following formula:

$$—(L^1)m—(L^2)n—$$

wherein $L^1$ represents —CON($R^2$)—, in which $R^2$ represents a hydrogen atom, an alkyl group having 1 to 4 carbon atoms or a substituted alkyl group having 1 to 6 carbon atoms, —COO—, —NHCO—, —OCO—,

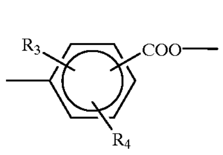

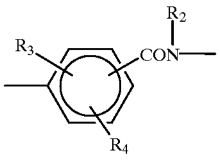

in which $R^3$ and $R^4$ independently represent a hydrogen atom, hydroxy, halogen atom, or an alkyl, alkoxy, acyloxy or aryloxy, each of which may be substituted or unsubstituted; $L^2$ represent a linkage group linking $L^1$ and X. The linkage group represented by L2 is preferably represented by the following formula:

$$—[X^1—(J^1—X^2)p—(J^2—X^3)q—(J^3)r]s—$$

where $J^1$, $J^2$ and $J^3$, which may be the same or different, represent —CO—, —$SO_2$—, —CON($R^5$)—, —$SO_2$N($R^5$)—, —N($R^5$)—$R^6$—, —N($R^5$)—$R^6$—N($R^7$)—, —O—, —S—, —N($R^5$)—CO—N($R^7$)—, —N($R^5$)—$SO_2$N($R^7$)—, —COO—, —OCO—, —N($R^5$)$CO_2$— or —N($R^5$)CO—, in which $R^5$ represents a hydrogen atom, an alkyl group having 1 to 6 carbon atoms or substituted alkyl group having 1 to 6 carbon atoms; $R^6$ represents an alkylene group having 1 to 4 carbon atoms and $R^7$ represents a hydrogen atom, an alkyl group having 1 to 6 carbon atoms or substituted alkyl group having 1 to 6 carbon atoms); p, q, r and s each 0 or 1; $X^1$, $X^2$ and $X^3$, which may be the same or different, each represents a straight-chained or branched alkylene, an aralkylene or a phenylene group, each of which has 1 to 10 carbon atoms and may be substituted or unsubstituted. Examples of the alkylene group include methylene, methylmethylene, dimethylmethylene, dimethylene, trimethylene, tetramethylene, pentamethylene, hexamethylene and decylmethylene; Examples of the aralkylene group include benzylidene; and examples of the phenylene group include p-phenylene, m-phenylene and methylphenylene.

X represents a univalent group containing an active methylene group, and preferred examples thereof include $R^8$—CO—$CH_2$—COO—, CN—$CH_2$—COO—, $R^8$—CO—$CH_2$—CO— or $R^8$—CO—$CH_2$—CON($R^5$)—, in which $R^5$ is the same as defined above, $R^8$ represents a substituted or unsubstituted alkyl group having 1 to 12 carbon atoms (e.g., methyl, ethyl, n-butyl, t-butyl, n-nonyl, 2-methoxyethyl, 4-phenoxybutyl, benzyl, 2-methanesulfonamidoethyl, etc.), substituted or unsubstituted aryl group (e.g., phenyl, p-methylphenyl, p-methoxyphenyl, o-chlorophenyl, etc.), substituted or unsubstituted alkoxy group (e.g., methoxy, ethoxy, methoxyethoxy, n-butoxy, etc.), substituted or unsubstituted cycloalkyloxy group (e.g., cyclohexyloxy), substituted or unsubstituted aryloxy group (e.g., phenoxy, p-methylphenoxy, o-chlorophenoxy, p-cyanophenoxy, etc.), and substituted or unsubstituted amino group (e.g., amino, methylamino, ethylamino, dimethylamino, butylamino, etc.).

The polymer represented by Formula (1) is preferable because of its good waterabsorbing characteristics.

In the polymer represented by formula (1), examples of the ethylenically unsaturated monomer containing an active methylene group and corresponding to the repeating unit A are shown below.

| | |
|---|---|
| MN-1 | 2-acetoacetoxyethyl methacrylate |
| MN-2 | 2-acetoacetoxyethyl acrylate |
| MN-3 | 2-acetoacetoxypropyl methacrylate |
| MN-4 | 2-acetoacetoxypropyl acrylate |
| MN-5 | 2-acetoacetoamidoethyl methacrylate |
| MN-6 | 2-acetoacetoamidoethyl acrylate |
| MN-7 | 2-cyanoacetoxyethyl methacrylate |
| MN-8 | 2-cyanoacetoxyethyl acrylate |
| MN-9 | N-(2-cyanoacetoxyethyl) acrylamide |
| MN-10 | 2-propionylacetoxyethyl acrylate |
| MN-11 | N-(2-propionylacetoxyethyl) methacrylamide |
| MN-12 | N-4-(acetoactoxybenzyl)phenyl acrylamide |
| MN-13 | ethylacryloyl acetate |
| MN-14 | acryloylmethyl acetate |
| MN-15 | N-methacryloyloxymethylacetoacetoamide |
| MN-16 | ethylmethacryloyl acetoacetate |
| MN-17 | N-allylcyanoacetoamide |
| MN-18 | methylacryloyl acetoacetate |
| MN-19 | N-(2-methacryloyloxyethyl) cyanoacetoamide |
| MN-20 | p-(2-acetoacetyl)ethylstyrene |
| MN-21 | 4-acetoacetyl-1-methacryloylpiperazine |
| MN-22 | ethyl α-acetacetoxymethacrylate |
| MN-23 | N-butyl-N-acryloyloxyethylacetoacetoamide |
| MN-24 | p-(2-acetoacetoxy)ethylstyrene |

The ethylenically unsaturated monomer of a repeating unit represented by B in formula (1) is such a monomer that a homopolymer of monomer B exhibits a glass transition temperature of not more than 350° C. Examples thereof include an alkylacrylate (e.g., methyl acrylate, ethyl acrylate, n-butyl acrylate, t-butyl acrylate, n-hexyl acrylate, benzyl acrylate, 2-ethyl acrylate, iso-nonyl acrylate, n-dodecyl acrylate, etc.), an alkyl methacrylate (e.g., n-butyl methacrylate, n-hexyl methacrylate, 2-ethylhexyl methacrylate, iso-nonyl methacrylate, n-dodecyl methacrylate, etc.) and dines (e.g., butadiene, isoprene, etc.). Of these is preferred a monomer such that a homopolymer exhibits a glass transition temperature of not more than 100° C., and specifically preferred examples thereof include an alkyl acrylate containing an alkyl side chain having 2 or more carbon atoms (e.g., ethyl acrylate, n-butylacrylate, 2-ethylhexyl acrylate, iso-nonyl acrylate, etc.), an alkyl methacrylate containing an alkyl side chain having 6 or more carbon atoms (e.g., n-hexyl methacrylate, 2-ethylhexyl methacrylate) and dienes (e.g., butadiene, isoprene, etc.).

The ethylenically unsaturated monomer of a repeating unit represented by C of formula (1) represents a repeating unit except for B, and it is preferably a repeating unit derived from such a monomer that a homopolymer of monomer C exhibits a glass transition temperature of more than 35° C. Examples of such monomers include acrylic acid esters (e.g., t-butyl acrylate, phenyl acrylate, 2-naphthyl acrylate, etc.), methacrylic acid esters (e.g., methyl methacrylate, ethyl methacrylate, 2-hydroxyethyl methacrylate, benzyl methacrylate, 2-hydroxypropyl methacrylate, phenyl methacrylate, cyclohexyl methacrylate, cresyl methacrylate, 4-chlorobenzyl methacrylate, ethylene glycol dimethacrylate, etc.), vinyl esters (e.g., vinyl benzoate, pivaloyloxyethylene, etc.), acrylamides (e.g., acrylamide, methylacrylamide, ethylacrylamide, propyl-acrylamide, butylacrylamide, t-butylacrylamide, cyclohexyl-acrylamide, benzylacrylamide, hydroxymethylacrylamide, methoxyethylacrylamide, dimethylaminoethylacrylamide, phenyl-acrylamide, dimethylacrylamide, β-cyanoethylacrylamide, diacetone acrylamide, etc.), methacrylamides (e.g., methacrylamide, methylmethacrylamide, ethylmethacrylamide, propylmethacrylamide, butylmethacrylamide, t-butyl-methacrylamide, cyclohexylmethacrylamide, benzyl-methacrylamide, hydroxymethylmethacrylamide, methoxyethylmethacrylamide, dimethylaminoethylmethacrylamide, phenyl-methacrylamide, dimethylmethacrylamide, diethylmethacrylamide, β-cyanoethylmethacrylamide, etc.), styrenes (e.g., styrene, methylstyrene, dimethylstyrene, trimethylenestyrene, ethyl-styrene, isopropylstyrene, chlorostyrene, methoxystyrene, acetoxystyrene, dichlorostyrene, bromstyrene, vinyl benzoic acid methyl ester, etc.), divinylbenzene, acrylonitrile, methacrylonitrile, N-vinylpyrrolidone, N-vinyloxazolidone, chlorovinylidene, and phenyl vinyl ketone.

Another sublayer of the present invention comprises two or more types of acryl based polymer latexes in which one type of polymer has the lowest glass transition point (hereinafter referred to as TgL) and the other type of polymer has the highest glass transition point (hereinafter referred to as TgH), and the difference in the glass transition points between the two types of these polymers is between 10 and 80° C. It is preferable that the acryl based monomers described below are employed, individually polymerized and mixed. At that time, the difference between TgH and TgL of each polymer is preferably between 10 and 80° C. Further, the mixing ratio of these polymer latexes is generally between 20:80 and 80:20 in terms of the weight ratio, and is preferably between 40:60 and 60:40.

The polymer having the TgH and the having the TgL mentioned above preferably occupy the content of 70 weight % in the polymer of the latex. The polymer is preferably employed in the invention because it has good resistance to scratch injure.

The acryl based polymer comprises acryl monomer component of, preferably 5 weight %, and more preferably 20 weight % in the polymer. Employed as monomers of the acryl based polymers in accordance with the present invention may be those similar to the aforementioned styrenes-diolefin based copolymers. It is possible to vary Tg depending on the types of acryl based monomers or other copolymerizable monomers.

Acryl based polymer latexes, which are useful in the present invention, are preferably produced utilizing emulsion polymerization. Polymerization conditions, polymerization initiators, surface active agents, and the like, are the same as those described previously. Said acryl based polymer latexes may be produced in the same manner as previously described.

In either case in which acryl based polymer latexes are hydrophilic or hydrophobic, the average diameter of the latex particles is preferably in the range of 0.005 to 2.0 $\mu$m, and is more preferably between 0.005 and 2.0 $\mu$m.

Listed as other copolymerizable monomers which form acryl based polymer latexes may be, for example, hydrophobic monomers such as styrenes, vinyl isocyanate, allyl isocyanate, vinyl methyl ether, vinyl ethyl ether, vinyl acetate, vinyl propionate, vinyl butyrate, vinyl valerate, vinyl pivalyate, and hydrophilic monomers such as unsaturated dicarboxylic acids (for example, itaconic acid, maleic acid, fumaric acid, and the like), unsaturated dicarboxylic acid esters (for example, methyl itaconate, dimethyl itaconate, methyl maleate, dimethyl maleate, methyl fumarate, dimethyl fumarate, and the like), salts of said unsaturated dicarboxylic acids (for example, sodium salts, potassium salts, and ammonium salts), monomers having a sulfonic acid group and salts thereof (for example, styrenesulfonic acid, vinylsulfonic acids and salts (such as sodium salts, potassium salts, and ammonium salts) thereof), acid anhydrides such as maleic anhydride, itaconic anhydride, and the like), and the like. Said monomers may be employed in combination of two or more types.

Said hydrophobic latexes refer to those having a solubility parameter SP value of less than 15, and are polymers which comprise almost no water solubilizing group. By contrast, hydrophilic latexes refer to those having a SP value of at least 15, and are polymers which comprise water solubilizing groups such as a sulfonic acid group, and the like. The dimension of said solubility parameter SP is $(J/ml)^{1/2}$. Said solubility parameter is detailed on pages 239 to 246 of Hiroshi Kakiuchi, "Toryojushi no Kagaku (Chemistry of Paint Resins)", (published Feb. 15, 1972).

Water-soluble polymers, crosslinking agents, surface active agents, antistatic agents, matting agents, slipping agents and the like may be incorporated into the sublayer comprised of said components.

Listed as organic solvents, which enable the sublayer of the present invention to be capable of solubilizing or swelling the support, and organic solvents of compositions comprising hydrophilic polymers, when the support is a polyester film, are, for example, as aromatic compounds having a hydroxyl group, resorcin, methylresorcin, phenol, chlorophenol, cresol, and the like, as aromatic compounds having a carboxyl group or acid anhydrides thereof, carboxylic acids or acid anhydrides thereof such as salicylic acid, benzoic acid, and the like. In the case of SPS, listed may be cyclohexane, ethylbenzene, methylene chloride, ethylene chloride, dioxane, methyl ethyl ketone, cyclohexanone, and the like. However, the present invention is not limited to these. In order to obtain both the desired flatness and adhesive properties, the content of these solvents is preferably between 1 and 20 parts by weight of the subbing treatment composition. Listed as hydrophilic polymers, which are employed together with these organic solvents, may be natural or synthetic polymers having on the side chain one or a plurality of hydrophilic groups, namely such as a hydroxyl group or a carboxyl group, or an acid anhydride, an amino group, or a cyclic amide group. Further, in order to improve the coatability described below, compounds similar to said water-soluble polymers may be utilized. Methods for preparing said sublayer composition are not particularly limited, and any method may be employed in which uniform mixing or a dispersion state is realized. For example, there is a method in which some amount of organic solvents is mixed with a water based composition; hydrophilic polymers are dissolved in the resulting mixture, and organic solvents having solubilizing capability or swelling capability are added to the resulting mixture, and a method in which organic solvents having solubilizing capability or swelling capability are added to a mixture consisting of water and organic solvents, and an aqueous hydrophilic polymer solution is added to the resulting mixture, and the like.

In order to enhance the coatability of said sublayer coating composition, water-soluble polymers are preferably added. Water soluble polymers include gelatin, gelatin derivatives (for example, phthalated gelatin), hydroxyethyl cellulose, carboxymethyl cellulose, methyl cellulose, hydroxypropyl methyl cellulose, ethyl hydroxyethyl cellulose, hydroxyethyl cellulose which is modified to exhibit hydrophobicity, polyvinylpyrrolidone, polyethylene oxide, xanthane, cationic hydroxyethyl cellulose, hydroxypropyl guar, guar, polyvinyl alcohol, polyacrylamide, sodium alginate, Carbopol (registered trade name), acrylamide thickening compositions, and the like. Of these described above, carboxymethyl cellulose sodium (abbreviated as CMC) can be effectively employed in the present invention. CMC-7LX (manufactured by Aqualon Company, Wilmington, Del., USA) generally has a degree of carboxymethyl substitution of 0.65 to 0.80 and an aqueous solution viscosity of 200 to 1,000 mPa.S at a concentration of 5 percent by weight in water. Further, it is possible to use other commercially available CMCs and those having a wide range of molecular weight as well as a degree of various carboxymethyl substitution. Furthermore, usefully employed are methyl cellulose and hydroxyethyl cellulose (marketed by Aqualon Company), ethyl hydroxyethyl cellulose (marketed by Berol Nobel Co.), and hydroxypropyl methyl cellulose (marketed by Aqualon Company, as well as Dow Chemical Co.). The employed amount is preferably not more than 10 percent by weight with respect to the total solid.

Further, for enhancing the layer strength of a sublayer, adhesion properties of a sublayer to a layer coated adjacent to said sublayer, as well as to a silver halide emulsion layer, crosslinking agents may be incorporated into said sublayer coating composition. Preferably employed as crosslinking agents are so-called hardeners for gelatin employed in image forming materials. Listed as hardeners may be, for example, triazine based compounds described in U.S. Pat. Nos. 3,325,287, 3,288,775, and 3,549,377, Belgian Patent No. 6,602,226, and others; di aldehyde based compounds described in U.S. Pat. Nos. 3,291,624 and 3,232,764, French Patent No. 1,543,694, British Patent No. 1,270,578, and others; epoxy based compounds described in U.S. Pat. No. 3,091,537, Japanese Patent Publication No. 49-26580, and others; vinyl based compounds described in U.S. Pat. No. 3,642,486; aziridine based compounds described in U.S. Pat. No. 3,392,024; ethyleneimine based compounds as well as methylol compounds described in U.S. Pat. No. 3,549,378 and others; and the like. Of these, dichlorotriazine derivatives are preferred.

The image forming materials of the present invention will now be described.

In the image forming materials, hydrophilic resins of the layer comprising hydrophilic resins on an antistatic layer are similar to the aforementioned water-soluble polymers, and are most preferably gelatin. The layer comprising said hydrophilic resins may be a layer only for protecting the silver halide emulsion layer. However, in the present invention, the layer comprising hydrophilic resins is most preferably a silver halide emulsion layer or a backing layer.

Generally, image forming materials have gelatin containing layers on both sides. Gelatin is incorporated as a binder into silver halide emulsion layers, light-insensitive layers, backing layers, and the like. The silver halide light-sensitive materials may have a silver halide light-sensitive layer either on one side or both sides. In the present invention, when the light-sensitive emulsion layer is positioned only on one side, an antistatic layer is provided on the backing layer side, opposite to the silver halide emulsion layer. When light-sensitive emulsion layers are positioned on both sides, the antistatic layer may also be provided on both sides.

The silver halide grains contained in the silver halide emulsion according to the invention may comprise silver bromide, silver iodobromide, silver iodochloride, silver chlorobromide, silver chloroiodobromide or silver chloride, etc. Of these silver halides are preferred silver iodobromide, silver chloroiodobromide and silver chloride.

With regard to the form of the silver halide grains used in the invention, it may be cube, octahedron, tetradecahedron, spherical form, tabular form or potato form etc. Of these are preferred tabular grains.

As a typical example of the silver halide grain preferably used in the invention, the tabular grain will be explained below. Preferable tabular grains used in the invention are one whose major plane is composed of (111) plane and further having plural parallel twin planes or one whose major plane is composed of (100).

An average value of the ratio (average aspect ratio) of grain diameter/thickness (aspect ratio) of the tabular silver halide grain employed in the present invention is not less than 2. The average aspect ratio is preferably between 2 and 12 and more preferably between 3 and 8.

The exterior wall of the above-mentioned tabular silver halide crystal may be substantially composed almost of a {111} plane or {100} plane, or may be composed of {111} and {100} planes in combination. In this case, the grain surface area is composed of the {111} plane of not less than 50 percent, more preferably the {111} plane between 60 and 90 percent, and most preferably the {111} plane between 70 and 95 percent. The planes other than the {111} plane are preferably composed mainly of the {100} plane. A plane ratio can be obtained by utilizing the difference in adsorption of a sensitizing dye onto the {111} plane and the {100} plane (refer to T. Tani, J. Imaging Sci., Volume 29, page 165 (1985)).

The tabular silver halide grains employed in the present invention may be either polydispersed grains or monodispersed grains, but the monodispersed grains are preferred. Specifically, when a distribution width is defined employing a relative standard deviation (variation coefficient) represented by (standard deviation of grain diameter/average grain diameter)×100=grain diameter distribution width (%), grains with not more than 25% are preferred, those with not more than 20% are more preferred, and those with not more than 15% are most preferred.

The tabular silver halide grains used in the invention are preferably those having a narrow grain thickness distribution. Thus, a width of grain thickness distribution, defined as below, is preferably 25% or less, more preferably 20% or less and furthermore preferably 15% or less:

(Standard deviation of grain thickness/average grain thickness)×100= width of grain thickness distribution (%)

A narrow halogen content distribution of each grain of the tabular silver halide grains used in the invention is preferable. Thus, a halogen content distribution, defined as below, is preferably 25% or less, more preferably 20% or less and furthermore preferably 15% or less:

(Standard deviation of halogen content/average halogen content)×100= width of halogen content ratio (%)

The tabular silver halide grain having the twin planes employed in the present invention is preferably hexagonal. The hexagonal tabular silver halide grain (hereinafter referred to as hexagonal tabular grain) is that the shape of the major faces ({111} face) is hexagonal and the maximum adjacent edge ratio is between 1.0 and 2.0. The maximum adjacent edge ratio herein is a ratio of the maximum edge length of the hexagon to the minimum edge length. In the present invention, if the maximum adjoining side ratio is between 1.0 and 2.0, the corner may be round. When the corner is round, the length of a side is represented by the length between intersecting points of an extending the straight portion and also extending the straight portions of the adjoining sides. Furthermore, a tabular silver halide grain forming nearly a round tabular grain due to further rounded corner is preferably employed.

In the present invention, regarding each edge forming the hexagon of a hexagonal tabular grain, not shorter than one and half of the edge is preferred to be substantially a straight line. In the invention, the adjacent edge ratio is preferably 1.0 to 1.5

The average projection area diameter of the tabular silver halide grain employed in the present invention is represented by the diameter of a circle having the same area as the above-mentioned grain projection area, and is preferably not less than 0.30 μm; more preferably between 0.30 and 5 μm; and most preferably between 0.40 and 2 μm. The grain diameter is obtained by enlarging the above-mentioned grain 10,000 to 70,000 times employing an electron microscope and measuring the projection area on the print.

Furthermore, an average diameter (ϕi) is obtained by the following formula, wherein n represents the number of measured grains, and ni represents a grain frequency having the grain diameter ϕi.

Average diameter (ϕi)=Σnidi/n (the number of measured grains is randomly set at not less than 1,000.)

The thickness of a grain can be obtained by obliquely observing a sample. The preferred thickness of the tabular grain employed in the present invention is between 0.03 and 1.0 μm, and more preferably between 0.05 and 0.5 μm.

The ratio of the longest distance (a) between at least two of parallel twin planes in the silver halide grain to the thickness (b) of the grain, (b/a), is preferably not less than 5, and the number ratio of the grains having the above-mentioned ratio of not less than 5 of the total is preferably not less than 50 percent. In the present invention, the average value of (a) is preferably not less than 0.008 μm, more preferably not less than 0.010 μm and not more than 0.05 μm. And in the present invention, at the same time (a) is in the above-mentioned range, it is necessary that a variation coefficient is not more than 35 percent, preferably not more than 30 percent.

Furthermore, in the present invention, taking the factors of the aspect ratio and the grain thickness into account, a planarity represented by the following formula, A=ECD/b2 is preferably not less than 20. Herein, ECD is an average projection diameter (μm) of the tabular grains and (b) is the thickness of the grain. The average projection diameter represents an number average of a diameter of circle having the same area as a projected area of the tabular grain.

The tabular silver halide grain employed in the present invention may has a uniform composition. However, a silver halide light-sensitive emulsion layer may be comprised of grains having a core/shell type structure comprising at least two layers with a substantially different halogen composition in the silver halide grain. The silver halide light-sensitive emulsion layer preferably contains not less than 50 percent of the core/shell type structure grains in number.

The core/shell type structure grain occasionally contains a silver halide composition region different from the core in center of the grain. In the above-mentioned case, a halogen composition of a seed grain may be optionally in combination of silver bromide, silver iodobromide, silver chloroiodobromide, silver chlorobromide and silver chloride, etc.

An average content ratio of silver iodide of the silver halide emulsion according to the present invention is preferably not more than 2 mole percent, more preferably 0.01 to 1.0 mole percent. In said grain having the structure of layers comprising different halogen composition, it is preferable that a layer of high content ratio of silver iodide is contained in the interior of the grain and a layer of low content ratio of silver iodide or a layer of silver bromide is contained in the outermost surface of the grain. In this case, the content ratio of silver iodide in the interior layer of the grain (core) having maximum silver iodide content ratio is not less than 2.5 mole percent, more preferably not less than 5 mole percent, and the content ratio of silver iodide in the outermost surface of the grain (shell) is 0 to 5 mole percent, preferably 0 to 3 mole percent. The content ratio of silver iodide in the core is preferably more than that in the shell by not less than 3 mole percent.

The distribution of silver iodide in the core is usually uniform, but occasionally silver iodide in the core is distributed. For example, higher concentration portion of silver iodide may exist at a farther point from the center of the grain, and maximum or minimum concentration portion of silver iodide may exist in an intermediate region of the core.

The silver halide grain employed in the present invention may be a so-called halogen conversion type grain. A halogen conversion amount is preferably between 0.2 and 2.0 mole percent of silver. The conversion may be carried out during physical ripening or after the completion of the physical ripening. As a halogen conversion method, an aqueous halogen solution or fine silver halide grains having less solubility product than the halogen composition on the grain surface prior to the halogen conversion are generally added. At the time, the fine grain size is preferably not more than 0.2 μm and more preferably between 0.02 and 0.1 μm.

The silver halide grain, employed in the present invention, is preferably grown in such a manner that silver halide is deposited on a seed crystal as a method described in, for example, JP-A No. 60-138538.

In preparing the emulsion according to the invention, forming process of seed grain and growing process of seed grain can be conducted in the presence of known silver halide solvents such as ammonia, thioether and thiourea, etc.

In order to prepare the tabular silver halide grains employed in the present invention, as conditions to grow the prepared seed grains, as described in, for example, JP-A Nos. 51-39027, 55-142329, 58-113928, 54-48521, and 58-49938, a water-soluble silver salt solution and a water-soluble halide solution are added employing a double-jet method and a method may be employed in which the rate of addition is gradually varied in the range such that no new nucleus is formed in accordance with the grain growth and no Ostwald ripening occurs. As another condition to enlarge the seed grains, as is described in Item 88 of Abstract Collection of 1983 Annual Meeting of Japan Photographic Society, a method may be employed in which grains are enlarged by adding fine silver halide grains to be allowed to dissolve and recrystallize.

Upon growing grains, an aqueous silver nitrate solution and an aqueous halide solution may be added employing a double-jet method, but halide and silver may be supplied to a system in the form of silver halide. The rate of addition is a rate at which a new nucleus is not generated and no broadening of a size distribution occurs due to Ostwald ripening, that is, addition is preferably carried out in the 30 to 100% range of the rate of new nucleus formation.

Upon preparing the silver halide emulsion of the present invention, stirring conditions during preparation are extremely important. As a stirring device, the device disclosed in JP-A No. 62-160128 is preferably employed in which an addition liquid nozzle is arranged, in a liquid, near a mother liquid sucking hole of the stirrer. Furthermore, in this case, the stirring rotation number is preferably set at 400 to 1,200 rpm.

The silver iodide content ratio and average silver iodide content ratio of silver halide grains employed in the present invention can be measured employing an EPMA method (Electron Probe Micro Analyzer). In this method, a sample is prepared in which emulsion grains are well dispersed so that the grains are not in contact with each other, and an element analysis for a micro part is carried out employing an X-ray analysis utilizing an electron beam excitation generated by electron beam irradiation. Employing this method, the halogen composition of each grain can be determined by measuring characteristic X-ray intensities of silver and iodide radiated from each grain. With at least 100 grains, the average silver iodide content ratio of each grain is obtained employing the EPMA method and the average silver iodide content ratio is then calculated.

Furthermore, during the grain forming process and/or grain growth process, the silver halide grains employed in the present invention may be subjected to incorporation of at least one metal ion selected from cadmium salts, zinc salts, thallium salts, iridium salts (including the complexes), and iron salts (including the complexes) in the grain interior and/or the grain surface layer, and further may be subjected to formation of reduction sensitization nuclei in the grain interior and/or the grain surface, while being placed in reduction environment. And, at the desired time, oxidizing agents such as hydrogen peroxide and thiosulfonic acid can be added.

The silver halide emulsion of the silver halide light-sensitive photographic material of the present invention may be subjected to removal of unnecessary salts after the completion of silver halide grain growth or retention of the salts. The removal of the above-mentioned salts can be carried out employing methods described in Research Disclosure (hereinafter referred to as RD) Item 17643 Section II.

Further, the silver halide emulsion layer employed in the present invention may comprise various shapes of grains as far as the effects of the present invention are not degraded.

The silver halide used in the silver halide photographic light-sensitive material of the present invention may be sensitized by various types of sensitizing methods.

Furthermore, a dye having no spectral sensitization capability or a compound having no absorption in the visible region which shows super sensitization used in combination with these spectral sensitizing dyes may be added in the emulsion.

The adding amount of the spectral sensitizing dye, depending on the kind of the dye, and structure, composition, ripening conditions, objectives and uses of silver halide, is preferably in such an amount as to be 40 to 90% of monomolecular layer coverage, and more preferably, 50 to 80%.

The monomolecular layer coverage refers to a relative value, based on that, when absorption isotherm at 50° C. is prepared, a saturated absorbing amount is 100% of the coverage.

The optimal amount of the spectral sensitizing dye, which is variable, depending on the total surface area of silver halide grains contained in an emulsion, is less than 600 mg and preferably less than 450 mg per mol of silver halide.

According to the invention, advantageous effects are enhanced by adding the sensitizing dye in the form of a solid fine particle dispersion rather than in the form of an organic solvent solution. At least one sensitizing dye is preferably added in the form of scarcely water-soluble, solid fine particles dispersed in water substantially free from an organic solvent and/or surfactant.

In the present invention, solubility in water of the sensitizing dye used in the form of the solid fine particle dispersion is preferably $2\times10^{-4}$ to $4\times10^{-2}$ mol/l, and more preferably $1\times10^{-3}$ to $4\times10^{-2}$ mol/l.

The sensitizing dye used in the invention can be added in the process of chemical sensitization, preferably at the start of chemical sensitization. Addition of the dye during the course of nucleation of a silver halide emulsion to completion of desalting process results in a sensitive silver halide emulsion with enhanced spectral sensitization efficiency. Furthermore, the same dye as added in the aforesaid processes (from the nucleus forming process to the completion of desalting process) or other kind of a spectral sensitizing dye can be additionally added in any process from the completion of desalting process through chemical ripening process to just before coating process.

Selenium sensitizer and tellurium sensitizers are employed preferably in the chemical sensitization. The amount of the selenium sensitizer to be used, depending on a selenium compound, silver halide grains and chemical ripening conditions, is generally $10^{-8}$ to $10^{-4}$ mol per mol of silver halide. Adding methods include, a method of adding the selenium compound solubilized, depending on the property of the selenium compound, in single or combined solvent of water or organic solvent such as methanol, ethanol, a method of adding the selenium compound previously mixed with gelatin aqueous solution, and a method of adding the selenium compound in an emulsion dispersion form of mixed solution with organic solvent miscible polymer described in JP-A No. 4-140739.

The temperature of chemical sensitization with the selenium sensitizer is preferably 40 to 90° C. and more preferably 45 to 80° C. The pH and pAg is preferably 4 to 9 and 6 to 9.5, respectively.

In the present invention, reduction sensitization is preferably used in combination. Said reduction sensitization is preferably conducted during the growth of the silver halide grain. The methods conducted during the growth include not only a method of the reduction sensitization conducted while the silver halide grain being grown, but also a method of the reduction sensitization conducted while the silver halide grain growth being intermitted, followed by growth of the silver halide grain subjected to the reduction sensitization.

In the present invention, the silver halide grain can be sensitized by the selenium compounds and the tellurium compounds, but further it can be sensitized by sulfur compounds and noble metal salts such as gold salt. Furthermore it can be sensitized by the reduction sensitization and in combination of these sensitization methods.

Examples of gold sensitizers include chloroauric acid, gold thiosulfate, gold thiocyanate, and gold complexes of various compounds such as thioureas and rhodanines.

The amount of the sulfur sensitizer and the gold sensitizer to be used is, depending on the kinds of the silver halide emulsion, the kinds of used compounds and chemical ripening conditions, is generally preferably $10^{-4}$ to $10^{-9}$ mol per mol of silver halide, more preferably $10^{-5}$ to $10^{-8}$ mol per mol.

In the present invention, the sulfur sensitizer and the gold sensitizer can be incorporated through solution in water, alcohols, or organic or inorganic solvents, or incorporated in the form of a dispersion employing water-insoluble solvents or a medium such as gelatin.

In the present invention, the sulfur sensitization and the gold sensitization can be simultaneously applied, or separately and stepwise applied. In the latter case, after the sulfur sensitization is appropriately applied or in course of the sulfur sensitization, the gold sensitization is applied so as to obtain preferred result.

The reduction sensitization is conducted by adding a reducing agent such as thiourea dioxide and ascorbic acid and their derivatives and/or water soluble silver salt to the silver halide emulsion so that the reduction sensitization is conducted during the silver halide grain growth of the silver halide emulsion.

An adding amount of the reducing agent is preferably varied according to the kinds of the reduction sensitizing agent, grain size of the silver halide grain, composition and crystal habit of the silver halide grain, reaction temperature, pH, pAg, etc. For example, in the case of thiourea dioxide, the adding amount of 0.01 to 2 mg per 1 mol of silver halide brings preferred result. In the case of ascorbic acid, the adding amount of 50 mg to 2 g per 1 mol of silver halide is preferred.

Preferable reduction sensitization condition includes temperature of about 40 to 70° C., time of about 10 to 200 minutes, pH of about 5 to 11, and pAg of about 1 to 10 (herein, pAg value is a reciprocal of $Ag^+$ ion concentration).

As a water soluble silver salt, silver nitrate is preferred. By adding the water soluble silver salt, so-called silver ripening is conducted which is one kind of the reduction sensitizing technique. pAg of the silver ripening is suitably 1 to 6, more suitably 2 to 4. As the condition of temperature, pH and time, the above-mentioned reduction sensitization condition is preferred. As a stabilizer of the silver halide photographic emulsion containing the silver halide grains subjected to the reduction sensitization of the invention, later mentioned general stabilizer can be used, but in combined usage with an antioxidant described in JP-A No. 57-82831 and/or thiosulfonic acid derivatives described in V. S. Gahler, [Festschrift fur wissenschaftliche Photographie Bd. 63, 133 (1969)] and JP-A 54-1019, excellent results are often obtained. Addition of these compounds may be conducted in any process of emulsion manufacturing process after crystal growth process until adjusting process just before coating.

In the present invention, fine particle silver halide grains can be added during any process after chemical ripening process until coating process, which includes the process between chemical ripening and coating thereafter.

For the purpose of accelerating adsorption of a spectral sensitizing dye to the silver halide grains, the fine silver iodide grains may be added during any process from chemical ripening to the period just before coating, but are preferably added during the chemical ripening. The chemical ripening process refers to a process from the time when physical ripening and a salt removal operation of the emulsion of the present invention are completed to the time when an operation is conducted to terminate the chemical ripening. Furthermore, the fine silver iodide grains may be intermittently added several times, and after the addition of the fine silver iodide grains, another chemical-ripened emulsion may be added. When the fine silver iodide grains are added, the temperature of the emulsion in a liquid state is preferably in the range of 30 to 80° C. and more preferably in the range of 40 to 65° C. The fine silver iodide grains is preferably added in a manner in which part or all of it disappears after addition of it until coating, and it is more preferable that not less than 20% of added fine silver iodide grains disappears just before coating.

A bleachable or bleachable dye may be contained in any optional at least one layer constituting a silver halide emulsion containing layer or a layer other than the silver halide emulsion containing layer. In this case, the light-sensitive material with high sensitivity, high sharpness and less dye stain can be obtained. The dye used in the light-sensitive material is appropriately selected from dyes capable of enhancing sharpness to remove undesired influence caused by light wavelength by absorbing the wavelength. It is preferable that the dye bleaches or leaches during developing process and when an image is formed, no stain is visually recognized.

The dye may be added in any constituting layer. That is, the dye may be added in at least one layer such as a light-sensitive emulsion layer, or other hydrophilic colloidal layer coated on the same side as said light-sensitive emulsion layer (for example, non-light sensitive layer such as an intermediate layer, a protective layer, a sublayer). The dye is preferably contained in either a silver halide emulsion layer or a layer closer to a support, or contained in both layers, more preferably contained in a layer adjacent to a transparent support. The concentration of the dye is preferably higher in the layer closer to the support.

In the present invention, an adding amount of the above-mentioned dye is variable according to an intended object of sharpness, but is preferably 0.2 $mg/m^2$ to 20 $mg/m^2$, more preferably 0.8 $mg/m^2$ to 15 $mg/m^2$.

The above-mentioned dye can be incorporated into a hydrophilic colloidal layer in an usual manner, namely, an appropriate concentration of aqueous solution of the dye or a solid fine particle dispersion of the dye can be incorporated. JP-A Nos. 1-158430, 2-115830, 4-251838 can be referred.

In cases where the silver halide emulsion layer is dyed, the dye is incorporated into a silver halide emulsion solution prior to coating or into an aqueous solution of hydrophilic colloid, then these solutions may be coated directly or through other hydrophilic colloidal layer on the support in various coating manners.

As mentioned above, it is preferred that the concentration of the dye is preferably higher in the layer closer to the support, therefore, in order to fix the dye in the layer closer to the support, a mordant can be applied. For example, nondiffusing mordant which bonds with at least one kind of the aforesaid dyes can be used.

The nondiffusing mordant can be bonded with the dye in known various manners in this art, specifically, bonding in gelatin powder is usually employed. Otherwise, after bonding in an appropriate binder, then thus obtained binder is dispersed in aqueous gelatin solution employing an ultrasonic homogenizer.

Bonding ratio is not constant depending on compounds, but usually 0.1 to 10 parts of the nondiffusing mordant bonds with 1 part of a water soluble dye. Using amount of the water soluble dye in combination with the nondiffusing mordant can be more than that of the singly used water soluble dye.

In cases where the dye bonded with the nondiffusing mordant is contained in the light-sensitive material, a constituting layer containing the dye bonded with the nondiffusing mordant is newly provided, but it is preferable that said layer is a coating layer adjacent to the transparent support.

Hydrazine compounds or tetrazolium compounds may be employed as contrast enhancing agent in case that the silver halide emulsion is adopted to a lithographic light sensitive material. Further nucleation accelerating agent can be employed. These are optionally added corresponding to the purpose of the light sensitive materials.

A variety of photographic c can be employed in the photographic material relating to the invention. The conventional v include compounds described in Research Disclosure No. 17643 (1978, December), ibid No. 18716 (1979, November), and ibid No. 308119 (1989, December). Below, compounds disclosed in these three references and locations thereof are given.

| | [RD-17643] | | [RD-18716] | [RD-308119] | |
|---|---|---|---|---|---|
| | Page | Category | Page | Page | Category |
| Chemical sensitizer | 23 | III | 648 upper right | 996 | III |
| Sensitizing dye | 23 | IV | 648–649 | 996–998 | VI A |
| Desensitizing dye | 23 | IV | | 998 | VI B |
| Dye | 25–26 | VIII | 649–650 | 1003 | VIII |
| Development accelerator | 29 | XXI | 648 upper right | | |
| Anti-foggant, Development inhibitor | 24 | IV | 649 upper right | 998–1000 | VI |
| Brightening agent | 24 | V | 647 upper right | 998 | V |
| Hardening agent | 26 | X | 651 upper left | 1004–1005 | X |
| Surfactant | 26–27 | XI | 650 lower right | 1005–1006 | XI |
| Anti-static agent | 27 | XIII | 650 lower right | 1006–1007 | XIII |
| Plasticizer | 27 | XII | 650 lower right | 1006 | XII |
| Lubricant | 27 | XII | 650 lower right | | |
| Matting agent | 28 | XVI | 650 right | 1008–1009 | XVI |
| Binder | 26 | IX | 651 left | 1003–1004 | IX |
| Support | 28 | XVII | | 1009 | XVII |

To the silver halide photographic light-sensitive material, if necessary, is applicable an antihalation layer, an intermediate layer, a filter layer, etc.

In the photographic light-sensitive material of the present invention, a photographic layer and other hydrophilic colloidal layer can be coated on the support or other layer in various coating manners. Methods of coating include a dip coating method, a roller coating method, a curtain coating method, an extrusion coating method and a slide-hopper coating method, etc. The methods described in Research Disclosure, vol. 176, p. 27 to 28, "Coating procedures" can be usable.

In the silver halide photographic light-sensitive material of the present invention, a developing agent such as aminophenol, ascorbic acid, pyrocatechol, hydroquinone, phenylenediamine or 3-pyrazolidone may be contained in the emulsion layer or other layers.

EXAMPLES

The present invention will now be detailed with reference to examples. However, the embodiments of the present invention are not to be construed as being limited to these examples.

Preparation of Samples

Samples after Coating

Samples, which had been set aside at 23° C. and 55 percent relative humidity for one week after coating silver halide emulsion layers and the like, were subjected to the tests described below.

Aging Simulation during Effective Life-time, Termed as Accelerated Aging

An image forming material was subjected to moisture content adjustment in a room conditioned at 23° C. and 55 percent relative humidity for 24 hours. Thereafter, the resulting sample was placed in an aluminum foil/black polyethylene film laminated barrier bag and said bag was tightly sealed. The resulting bag was placed in a 40° C. oven for three weeks. Said bag was then cooled to room temperature and the sample was removed after unsealing the bag. The sample was subjected to the tests described below. Incidentally, a heating method employing the barrier bag is one in which performance variation during the effective life-time is estimated in a shortened period.

Sample prior to Photographic Processing

An image forming material, which was prepared by coating and was not yet subjected to photographic processing, was designated as a sample prior to photographic processing. Said sample was subjected to the following tests.

Sample after Photographic Processing

An image forming material, which was prepared by coating and was subjected to photographic processing, was designated as a sample after photographic processing. Said sample was subjected to the following tests.

Tests and Evaluation Methods

Adhesion Test and its Evaluation

Each sample was cut to 20×20 cm. The reverse surface of a light-sensitive material for graphic arts and the emulsion surface of an X-ray sensitive material was subjected to 30 mm long cut employing a razor blade at an angle of 45 degrees to the support, penetrating to the surface of the support, while. Each of the resulting samples was subjected to moisture content adjustment at an ambience of 23° C. and 80 percent relative humidity for 24 hours. Thereafter, an approximately 24 mm wide and 50 mm long cellophane adhesive tape was adhered onto the cut area at the right angle so as to cross the cut, and the adhered tape was strongly pressed so as to achieve close adhesion. Subsequently, the end of the cellophane adhesive tape on the acute angle side of the cut was manually gripped, and said tape was rapidly peeled off in the approximately parallel direction to the sample surface. Then the area, which was adhered to the cellophane adhesive tape, was determined, while the area, which was peeled by the cellophane adhesive tape, was determined. Evaluation was carried out based on the criteria described below.

A: no peeling

B: being slightly peeled at the cut

C: peeled area of less than 10 percent

D: peeled area of 10 to 50 percent

E: peeled area of 51 to 100 percent

F: peeled area was greater than the tape-adhered area

Test for Abrasion Resistance and its Evaluation

Each sample of image forming materials was subjected to moisture content adjustment at 23° C. and 55 percent relative humidity for 24 hours. Subsequently, the tip of a sapphire needle, having a radius of curvature of 0.15 mm, was placed on the test surface at the right angle, and the load applied to said sapphire needle was gradually increased from 0 g to 200 g at a constant ratio, while moving the sample at a rate of 60 cm/minute. The load, which resulted in abrasion which penetrated to the support surface, was recorded as the abrasion resistance. The recorded value was converted to the rank described below and was then evaluated. Further, on the 200 g load line in which most part was not abraded, if any partial abrasion reaching the support surface was noted, said load was recorded.

A: at least 200 g

B: 180 to 199 g

C: 150 to 179 g

D: 100 to 149 g

E: 50 to 99 g

Crack Test Method and its Formation Evaluation

Each of 10×12 inch size samples of image forming materials was heated at 55° C. for 3 days to a absolutely dried state, and then set aside for cooling for three days. The formation of fine cracks on the surface on the silver halide emulsion side was observed visually, as well as by employing a magnifying lens. Then evaluation was carried out based on the criteria described below.

A: no cracking was observed

B: fine cracks were observed in 1 to 5 areas, but they were not visually noticed C: fine cracks were observed in at least 6 areas, but they were not visually noticed D: fine cracks were formed in the large area and they were visually noticed E: in several areas, minor cracks were chained to result in fairly large cracks F: minor cracks were noticed on the entire surface and a number of large cracks were noticed.

Measurement of Surface Resistivity

A sample prior to photographic processing was subjected to moisture content adjustment at 23° C. and 20 percent relative humidity for 24 hours. Subsequently the resistivity of the reverse surface of said sample was measured employing a Teraohm Meter Model VE-30 manufactured by Kawaguchi Denki Co., Ltd. Measured values are expressed by Ω·cm. It should be noted that in Table 3 described below, this unit is deleted.

Formation of Electrostatic Marks and its Evaluation

The large size sample of a silver halide X-ray sensitive photographic material was subjected to moisture content adjustment at 23° C. and 20 percent relative humidity for 24 hours. Subsequently, in a room conditioned as above, a rubber roller was rolled under pressure 10 times on the surface of the resulting sample placed on a rubber board (a rubber board roller system), and the photographic processing, described below, was carried out. Then the formation of electrostatic marks (black marks) was evaluated based on the following criteria:

A: no marks were formed

B: one or two marks in the form of a tiny point (a size which was identified only utilizing a magnifying lens) were formed C: 3 to 10 tiny points were formed D: 11 to 50 tiny points were formed E: many spark-like marks were formed F: black marks were formed all over the surface.

Coatability

The coating state of each antistatic layer-coated sample was subjected to reflection of a florescent lamp, and was evaluated based on the criteria described below:

A: no coating mottles were noticed

B: slight surface flickering was noticed

C: slight coating mottles and streaks were noticed

D: streaks were generated at coagula and coating mottles were clearly noticed

E: many coagula were formed and many streak and mottles were formed.

It was evaluated that A and B were commercially viable and C, D, and E were commercially unviable.

Water Absorbability

An image forming material was immersed in a developer, a fixer and pure water in said order under the conditions described below, and water on the resulting surface was then removed employing a filter paper. The amount of absorbed water per unit area was obtained based on the differences in the weight before and after said immersion. The less the amount of absorbed water is, the better.

| | | |
|---|---|---|
| Developer | 35° C. | 15 seconds |
| Fixer | 33° C. | 15 seconds |
| Pure water | 20° C. | 15 seconds |

Scratch Resistance

A silver halide light-sensitive material was subjected photographic processing as described below. Said material completing the drying process was subjected to moisture content adjustment in an ambience of 23° C. and 55 percent relative humidity for 24 hours. The tip of a sapphire needle, having a radius of curvature of 0.15 mm, was brought into contact with the resulting material at a right angle, and load applied to said sapphire needle was gradually increased from 0 g to 200 g while moving said material at a rate of 60 cm/minute. The load, at which the resulting scratch reached the surface of the polyester support, was utilized as an index for evaluating the scratch resistance. It was judged that 200 g or more was commercially viable while 100 g or less was commercially unviable.

Preparation of Coating Composition

Preparation of Electrically Conductive Compositions CC-1 through CC-3 and Comparative Compositions HC-1 through HC-3

An aqueous dispersion (having 20 percent solids) of polymer particles and an aqueous solution of a water-soluble polymer shown in Table 2 below were mixed at 20° C. so as to obtain the ratio shown in Table 2. Thereafter, the resulting mixture was subjected to treatment under the heating shown in Table 2, and was then cooled to 20° C., whereby a target composition was obtained.

Preparation of Electrically Conductive Composition CC-4

Placed in a 1-liter capacity 4-necked flask fitted with a stirrer, a thermometer, a dripping funnel, a nitrogen gas inlet pipe, and a reflux cooling unit were 750 ml of pure water, 100 g of APS-5, and 30 g of SP-23. Subsequently the resulting mixture was heated so that the interior temperature reached 70° C. During heating, nitrogen gas was introduced and after the interior temperature reached 70° C., was introduced for further 30 minutes. Thereafter, a solution prepared by dissolving 1.3 g of ammonium persulfate in 10 ml of water was added. Then a mixture, consisting of 40 g of GMA, 20 g of BA, and 40 g of St, was placed in a dripping funnel and dripped for approximately one hour. After completing a monomer dripping, the resulting mixture was subjected to a thermal treatment for one hour. Thereafter, a reaction solution was cooled, followed by the addition of a solution prepared by dissolving 100 g of ASP-5 in 400 g of water. The resulting mixture was stirred for 10 minutes, and coarse grains were filtered, whereby a target product was obtained.

Preparation of Antistatic Layer Coating Compositions 1 through 4 and Comparative Antistatic Layer Coating Compositions 1 through 3

| | |
|---|---|
| Electrically conductive composition (CC 1 through 4 and HC 1 through 3, refer to Table 2) | 60 g |
| Silica matting agent (having an average particle diameter of 0.3 μm) | 0.07 g |
| (C-1) | 0.07 g |
| Water to make | 1 liter |

(C-1)

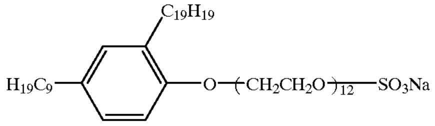

(C-4)

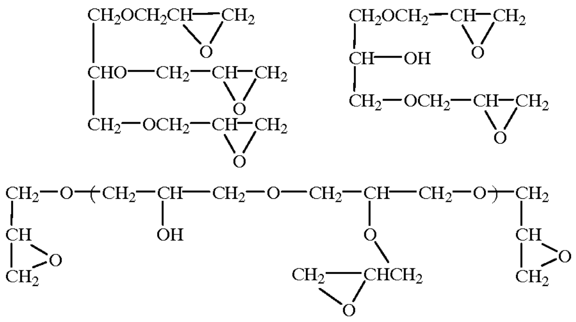

Mixture of three compounds

-continued

| | |
|---|---|
| <<Preparation of Subbing Lower Layer Coating Composition u-4>> | |
| Styrene/butadiene latex (Nipol LX432, Nippon Zeon) | 250 g |
| Methyl cellulose (10 percent by weight aqueous solution) | 100 g |
| Silica matting agent (having an average particle diameter of 3.0 μm) | 5 g |
| Sodium 2,4-dichloro-6-hydroxy-s-triazine | 5 g |
| Water | 660 g |
| <<Preparation of Subbing Lower Layer Coating Composition u-5>> | |
| Copolymer of vinylidene chloride/methyl methacrylate/acrylonitrile/glycidyl acrylate (89/3/1/7) (having a solid portion of 50 percent by weight) | 70 g |
| Silica matting agent (having a average diameter of 3.0 μm) | 1 g |
| Sodium 2,4-dichloro-6-hydroxy-1,3,5-triazine | 5 g |
| Water | 900 g |
| <<Preparation of Subbing Lower Layer Coating Composition u-6>> | |
| Copolymer of vinylidene chloride/methyl acrylate/acrylonitrile/acrylic acid (86/10/1/3) (having solids of 50 percent by weight) | 70 g |
| Silica matting agent (having an average diameter of 3.0 μm) | 1 g |
| Sodium 2,4-dichloro-6-hydroxy--1,3,5-triazine | 20 g |
| Water | 900 g |

TABLE 2

| Anti-static Layer Coating Composition No. | Electrically Conductive Composition: Electri-cally Conductive Composi-tion No. | Type of Fine Polymer Particles | Type of Water-soluble Polymer | Fine Polymer Particles/Water-soluble Polymer (ratio by weight) | Heating Conditions: Temper-ature (in ° C.) | Time (in minute) | Remarks |
|---|---|---|---|---|---|---|---|
| 1 | CC-1 | LX-9 | APS-2 | 1/2 | 70 | 60 | |
| 2 | CC-2 | LX-13 | APS-2 | 2/1 | 70 | 60 | |
| 3 | CC-3 | LX-3 | APS-5 | 1/2 | 60 | 30 | |
| 4 | CC-4 | LX-1 | APS-5 | 1/2 | 70 | 60 | |
| Comparative 1 | HC-1 | LX-9 | APS-2 | 1/2 | 45 | 120 | |
| Comparative 2 | HC-2 | LX-9 | APS-2 | 1/2 | 23 | 300 | |
| Comparative 3 | HC-3 | LX-9 | APS-2 | 1/2 | 95 | 30 | impossible to coat due to coagulation |

| | |
|---|---|
| <<Preparation of Subbing Lower Layer Coating Composition u-3>> | |
| Styrene/butadiene latex (Nipol LX473, Nippon Zeon) | 500 g |
| Silica matting agent (having an average particle diameter of 5.0 μm) | 10 g |
| Sodium 2,4-Dichloro-6-hydroxy-s-triazine | 10 g |
| Water | 480 g |

-continued

| | |
|---|---|
| <<Preparation of Subbing Lower Layer Coating Composition u-7>> | |
| Copolymer of LX-4 (MN-1/glycidyl methacrylate/styrene (20/40/40) (having 30 percent solids by weight) | 250 g |
| Copolymer latex of styrene/glycidyl methacrylate/n-butyl acrylate | 13 g |

-continued

| | |
|---|---|
| (20/40/40) | |
| (C-1) | 0.6 g |
| Water to make | 1 liter |
| <<Preparation of Subbing Lower Layer Coating Composition u-8>> | |
| Copolymer of LX-3 (MN-5/isononyl acrylate/cyclohexyl methacrylate (40/30/30) (having solids of 30 percent by weight) | 270 g |
| (C-1) | 0.6 g |
| Water to make | 1 liter |
| <<Preparation of Subbing Lower Layer Coating Composition u-9>> | |
| Copolymer of LX-5 (MN-13/vinyl acetate/ethyl methacrylate (40/30/30) (having solids of 30 percent by weight) | 270 g |
| (C-1) | 0.6 g |
| Water to make | 1 liter |
| <<Preparation of Subbing Lower Layer Coating Composition u-10>> | |
| Copolymer of LX-14 (MN-1/isononyl acrylate/styrene (40/30/30) (having solids 30 percent by weight) | 270 g |
| (C-1) | 0.6 g |
| Water to make | 1 liter |
| <<Preparation of Subbing Lower Layer Coating Composition u-11>> | |
| Copolymer latex of styrene/glycidyl methacrylate/n-butyl acrylate (20/40/40) (having a Tg of 20° C.) | 130 g |
| Copolymer latex of styrene/glycidyl methacrylate/n-butyl acrylate (59.5/40/0.5) (having a Tg of 75° C.) | 130 g |
| (C-1) | 30 g |
| Water to make | 1 liter |
| <<Preparation of Subbing Lower Layer Coating Composition u-12>> | |
| Copolymer latex of styrene/glycidyl methacrylate/n-butyl acrylate (20/40/40) (having a Tg of 20° C.) | 130 g |
| Copolymer latex of styrene/t-butyl acrylate/n-butyl acrylate/2-hydroxyethyl methacrylate (27/35/10/28) (having a Tg of 64° C.) | 130 g |
| (C-1) | 30 g |
| Water to make | 1 liter |
| <<Preparation of Subbing Lower Layer Coating Composition u-13>> | |
| Copolymer latex of styrene/glycidyl methacrylate/n-butyl acrylate (20/40/40) (having a Tg of 20° C.) | 130 g |
| Copolymer latex of styrene/n-butyl acrylate/acrylamide (45/45/10) (having a Tg of 55° C.) | 130 g |
| (C-1) | 30 g |
| Water to make | 1 liter |
| <<Preparation of Subbing Lower Layer Coating Composition u-16>> | |
| Gelatin | 10 g |
| Water | 10 g |
| Acetic acid | 10 g |
| Methanol | 470 g |
| Methylene dichloride | 460 g |
| p-Chlorophenol | 40 g |
| <<Preparation of Subbing Lower Layer Coating Composition u-17>> | |
| Gelatin | 10 g |
| Water | 10 g |
| Acetic acid | 10 g |
| Methanol | 470 g |
| Methylene dichloride | 500 g |
| p-Chlorophenol | 40 g |

Example 1

Preparation of Subbed Support of Silver Halide Light-sensitive Material for Graphic Arts A 100 μm thick PET film, which had been biaxially stretched and thermally fixed, was subjected on both sides to corona discharge treatment of 8 W/$m^2$·minute. Subsequently, each of the sublayer coating compositions u-1 through u-17 (shown in Table 3) was applied onto both surfaces to obtain a dried layer thickness of 0.8 μm, and subsequently dried. Then, one surface was designated as an emulsion layer side sublayer, while the other surface was designated as the backing layer side sublayer.

Coating of Upper Sublayer

The surface of said emulsion layer side sublayer was subjected to corona discharge treatment of 8 W/$m^2$·minute, and the upper sublayer coating composition described below was applied at a coverage of 10 ml/$m^2$, and subsequently dried at 100° C. for one minute. The resulting layer was designated as a upper sublayer.

| <<Preparation of Upper Sublayer Composition>> | |
|---|---|
| Gelatin | 10 g |
| (C-1) | 0.2 g |
| (C-2) | 0.2 g |
| (C-3) | 0.1 g |
| (C-F) | 0.1 g |
| Silica particles (having an average particle diameter of 3.0 μm) | 0.1 g |
| Water to make | 1 liter |

(C-2)

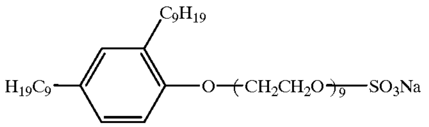

(C-3)

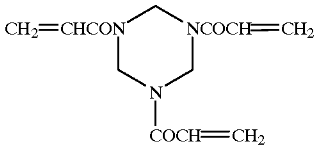

(C-F)

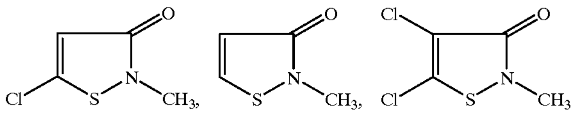

(Component A) (Component B) (Component C)

Components A:Components B:Components C = 50::46:4 (in mole ratio)

Coating of Antistatic Layer

The surface of the backing layer side sublayer was subjected to corona discharge treatment of 8 W/$m^2$·minute, and each of said antistatic layer coating compositions 1 through 4 as well as each of comparative antistatic layer coating composition 1 and 2 (it was impossible to apply comparative antistatic layer coating composition 3 due to coagulation) was applied employing a combination of a roll coater and a wire bar to obtain a dried layer thickness of 1.0 μm, and subsequently dried at 100° C. for one minute. The resulting layer was designated as an antistatic layer.

Thermal Treatment of Subbed Support

Said subbed support for silver halide light-sensitive materials for graphic arts was heated at 140° C. during the subbing drying process, and subsequently gradually cooled.

Preparation of Image forming materials for Graphic arts

Silver halide emulsions for graphic arts were employed which are described in paragraphs [0081] through [0083] of Japanese Patent Publication Open to Public Inspection No. 6-258783. The silver halide emulsion coating composition of Formula 1 described below was applied onto the upper sublayer of the subbed support of said silver halide light-sensitive material for graphic arts to obtain a silver coverage of 2.9 g/$m^2$ and a gelatin coverage of 1.2 g/$m^2$, and the coating composition of Formula 2 as the protective layer, described below, was simultaneously applied onto the resulting layer at a gelatin coverage of 0.6 g/$m^2$ along with the emulsion layer and the protective layer in the form of a multilayer. Further, onto the antistatic layer on the opposite surface, the backing layer (as a layer comprising hydrophilic resins) of Formula 3, described below, was applied at a gelatin coverage of 0.6 g/$m^2$. Further, onto the resulting surface, the protective layer of said backing layer of Formula 4, descried below, was simultaneously applied at a gelatin coverage of 0.4 g/$m^2$ along with said backing layer in the form of a multilayer. Thus, samples of image forming materials for graphic arts were obtained.

Formula 1, Compositions of Silver Halide Emulsion Coating Composition for Graphic Arts, and Coated Amount

| | |
|---|---|
| (C-5) Sensitizing dye | 0.6 mg/$m^2$ |
| H-7 Hydrazine compound | 30 mg/$m^2$ |
| (C-6) Amino compound | 50 mg/$m^2$ |
| (C-7) Surface active agent | 100 mg/$m^2$ |
| (C-8) Latex polymer | 1.0 mg/$m^2$ |
| (C-9) Hardener | 30 mg/$m^2$ |
| Sodium isoamyl-n-decylsulfosuccinate | 0.7 mg/$m^2$ |
| 2-Mercapto-6-hydroxypurine | 10 mg/$m^2$ |
| EDTA | 50 mg/$m^2$ |

<<Formula 2, Compositions of Emulsion Protective Layer and Coated Amount>>

| | |
|---|---|
| Gelatin | 0.6 g/$m^2$ |
| Sodium isoamyl-n-decyl sulfosuccinate | 12 mg/$m^2$ |
| Matting agent (monodispersed silica having an average particle diameter of 3.5 μm) | 25 g/$m^2$ |
| (C-10) Hardener | 30 g/$m^2$ |
| (C-11) Surface Active Agent | 1 mg/$m^2$ |
| Colloidal silica (having an average particle diameter of 0.05 μm) | 20 mg/$m^2$ |

<<Formula 3, Compositions of Backing layer and Coated Amount>>

| | |
|---|---|
| Gelatin | 0.6 g/$m^2$ |
| Sodium isoamyl-n-decyl sulfosuccinate | 5 mg/$m^2$ |
| (C-8) Latex polymer | 0.3 g/$m^2$ |
| Colloidal silica (having an average particle diameter of 0.05 μm) | 70 mg/$m^2$ |
| Sodium polystyrenesulfate | 20 mg/$m^2$ |
| (C-12) Hardener | 100 mg/$m^2$ |

<<Formula 4, Compositions of Backing layer Protective Layer and Coated Amount>>

| | |
|---|---|
| Gelatin | 0.4 g/$m^2$ |
| Monodisperse polymethyl methacrylate matting agent (having an average particle diameter of 5 μm) | 50 mg/$m^2$ |
| Sodium di-(2-ethylhexyl) sulfosuccinate | 10 mg/$m^2$ |
| (C-11) Surface active agent | 1 mg/$m^2$ |
| (C-13) Dye | 20 mg/$m^2$ |
| $H—(OCH_2CH_2)_{68}—OH$ | 50 mg/$m^2$ |
| (C-10) Hardener | 15 mg/$m^2$ |
| Polysiloxane | 0.7 g/$m^2$ |

(C-5)

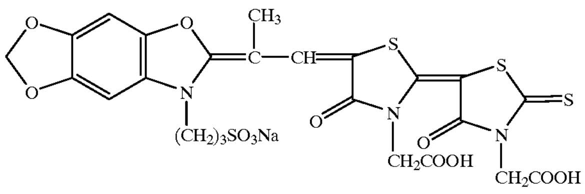

(C-6)

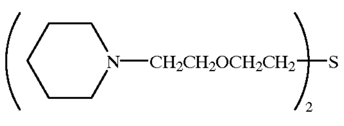

(C-7)

-continued
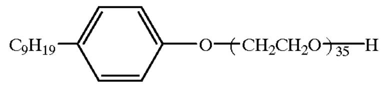
(C-8)
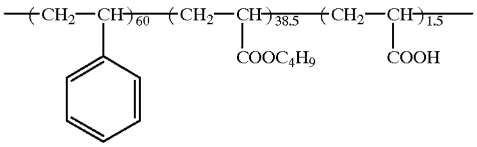
(C-9)
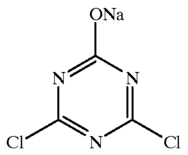
(C-10)
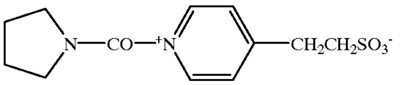
(C-11)
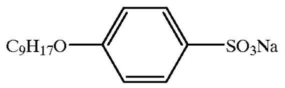
(C-12)
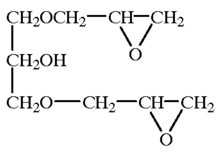
(C-13)
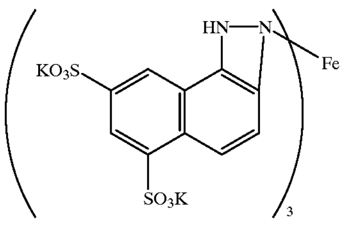
H-7
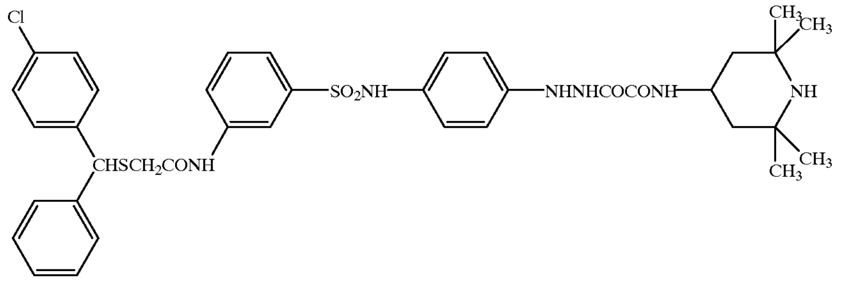
Samples obtained as described above were processed employing the developer, fixer and conditions described in paragraphs [0139] through [0141] of Japanese Patent Publication Open to Public Inspection No. 7-20594. The resulting backing layer was evaluated in accordance with said test methods. Table 3 shows the results.

TABLE 3

| | | | Adhesion Properties | |
|---|---|---|---|---|
| Sample No. | Sublayer Coating Composition Type | Antistatic Layer Coating Composition Type | Sample after Coating Before Photographic Processing/ After Photographic Processing | Sample under Accelerated Aging Before Photographic Processing/ After Photographic Processing |
| 1 | u-3 | 1 | A/A | A/A |
| 2 | u-4 | 2 | A/A | A/A |
| 3 | u-5 | 3 | A/A | A/A |
| 4 | u-6 | 4 | A/A | A/A |
| 5 | u-7 | 1 | A/A | A/A |
| 6 | u-8 | 2 | A/A | A/A |
| 7 | u-9 | 3 | A/A | A/A |
| 8 | u-10 | 4 | A/A | A/A |
| 9 | u-11 | 1 | A/A | A/A |
| 10 | u-12 | 2 | A/A | A/A |
| 11 | u-13 | 3 | A/A | A/A |
| 12 | u-3 | 3 | A/A | A/A |
| 13 | u-3 | Comparative 1 | B/C | D/E |
| 14 | u-5 | Comparative 2 | B/C | D/E |
| 15 | u-7 | Comparative 1 | B/C | D/E |
| 16 | u-11 | Comparative 2 | B/C | D/E |
| 17 | u-15 | Comparative 1 | E/E | F/F |

| | Abrasion Resistance | | Surface Resistivity ($\times 10^{11}$) | |
|---|---|---|---|---|
| Sample No. | Sample after Coating Before Photographic Processing/ After Photographic Processing | Sample under Accelerated Aging Before Photographic Processing/ After Photographic Processing | Sample after Coating Before Photographic Processing/ After Photographic Processing | Sample under Accelerated Aging Before Photographic Processing/ After Photographic Processing |
| 1 | A/A | A/A | 3.0/40 | 5.2/50 |
| 2 | A/A | A/A | 3.1/40 | 6.5/55 |
| 3 | A/A | A/A | 3.2/38 | 4.5/35 |
| 4 | A/A | A/A | 3.1/40 | 5.0/50 |
| 5 | A/A | A/A | 3.0/39 | 4.5/48 |
| 6 | A/A | A/A | 3.1/38 | 4.2/38 |
| 7 | A/A | A/A | 3.3/67 | 4.2/41 |
| 8 | A/A | A/A | 3.2/38 | 4.2/49 |
| 9 | A/A | A/A | 3.3/83 | 4.8/50 |
| 10 | A/A | A/A | 3.3/35 | 4.9/49 |
| 11 | A/A | A/A | 2.9/40 | 4.0/39 |
| 12 | A/A | A/A | 3.3/39 | 4.4/49 |
| 13 | F/F | F/F | 3.7/420 | 130/980 |
| 14 | F/F | F/F | 3.5/250 | 95/870 |
| 15 | F/F | F/F | 3.8/300 | 120/950 |
| 16 | F/F | F/F | 3.5/340 | 100/860 |
| 17 | F/F | F/F | 3.8/500 | 130/990 |

Results

As can be seen from Table 3, it was found that the antistatic layers comprised of electrically conductive compositions of the present invention, and the backing layers of image forming materials utilizing the sublayer of the present invention exhibited excellent adhesion properties, abrasion resistance, and antistatic performance (in terms of the surface resistivity) ranging from samples after coating to those which were subjected to accelerated aging, and even after photographic processing. By contrast, Samples 12, 13, 15, and 16, provided with the backing layers, which were not covered by the present invention, exhibited good antistatic performance, while exhibiting insufficient adhesion properties as well as insufficient abrasion resistance. Further, it was found that Samples 17 through 23, in which comparative electrically conductive compositions were employed, exhibited markedly insufficient adhesion properties, abrasion resistance as well as antistatic performance.

Example 2

Preparation of Subbed Support for Silver Halide X-ray Sensitive Photographic Material A 175 $\mu$m thick biaxially stretched and thermally fixed PET film, having a blue tint of a density of 0.15, was subjected to corona discharge treatment of 8 $W/m^2$·minute. Each of said subbing layer coating compositions u-1 through u-17 was then applied to both surfaces of the resulting support to obtain a dried layer thickness of 0.8 $\mu$m, and was subsequently dried, whereby a sublayer was formed.

Coating of Antistatic Layer

Applied onto both surfaces of said sublayer was an 8 $W/m^2$·minute corona discharge. Subsequently, each of said antistatic layer coating compositions 1 through 4 and comparative antistatic layer coating compositions 1 and 2 was applied to both surfaces employing a combination of a roll coater and a wire bar so as to obtain a layer thickness of 1.0 micron after drying, and subsequently dried at 140° C. for one minute, whereby an antistatic layer was formed. Thus a subbed support for silver halide X-ray sensitive photographic materials was prepared.

Thermal Treatment of Supports

Said subbed support for silver halide X-ray sensitive photographic materials was heated at 140° C. and subsequently gradually cooled.

Preparation of Samples of Silver Halide X-ray Sensitive Photographic Materials

Onto both surfaces of the subbed support for silver halide X-ray sensitive photographic materials were uniformly applied a crossover cut layer, an emulsion layer, an interlayer, and a protective layer, in said order, as described below and subsequently dried. Thus, samples of the silver halide X-ray sensitive photographic materials were prepared. At that time, coating was carried out so as to obtain a silver coverage of 1.3 g/m , a gelatin coverage of 0.4 $g/m^2$ on the protective layer, 0.4 $g/m^2$ on the interlayer, 1.5 $g/M^2$ on the emulsion layer and 0.2 $g/m^2$ on the crossover cut layer on one surface of each sample.

First Layer (Crossover Cut Layer)

| | |
|---|---|
| Fine solid particle disperse dye (AH) | 180 $mg/m^2$ |
| Gelatin | 0.2 $g/m^2$ |
| Sodium dodecylbenzenesulfonate | 5 $mg/m^2$ |
| Compound (I) | 5 $mg/m^2$ |
| Latex (L) | 0.2 $g/m^2$ |
| 2,4-Dichloro-6-hydroxy-1,3,5-triazine sodium | 5 $mg/m^2$ |
| Colloidal silica (having an average particle diameter of 0.014 $\mu$m) | 10 $mg/m^2$ |
| Hardener (A) | 2 $mg/m^2$ |
| Second Layer (Silver Halide Emulsion Layer) | |
| Various additives described below were added to the silver halide X-ray sensitive emulsion described in paragraphs [0197] through [0204] of Japanese Patent Publication Open to Public Inspection No. 7-114130, and the resulting mixture was coated. | |
| Compound (G) | 0.5 $mg/m^2$ |
| 2,6-bis(hydroxyamino)-4-diethylamino-1,3,5-triazine | 5 $mg/m^2$ |

-continued

| | |
|---|---|
| t-Butylcatechol | 130 mg/m$^2$ |
| Polyvinylpyrrolidone (having a molecular weight of 10,000) | 35 mg/m$^2$ |
| Styrene-maleic anhydride copolymer | 80 mg/m$^2$ |
| Sodium polystyrenesulfonate | 80 mg/m$^2$ |
| Trimethylolpropane | 350 mg/m$^2$ |
| Diethylene glycol | 50 mg/m$^2$ |
| Nitrophenyl-triphenyl-phosphonium chloride | 20 mg/m$^2$ |
| Ammonium 1.3-dihydroxybenzene-4-sulfonate | 500 mg/m$^2$ |
| Sodium 2-mercaotobenzimidazol-5-sulfonate | 5 mg/m$^2$ |
| Compound (H) | 0.5 mg/m$^2$ |
| n-$C_4H_9OCH_2CH(OH)CH_2N(CH_2COOH)_2$ | 350 mg/m$^2$ |
| Compound (M) | 5 mg/m$^2$ |
| Compound (N) | 5 mg/m$^2$ |
| Colloidal silica | 0.5 mg/m$^2$ |
| Latex (L) | 0.2 mg/m$^2$ |
| Dextran (having an average molecular weight of 1,000) | 0.2 mg/m$^2$ |
| Compound (P) | 0.2 mg/m$^2$ |
| Compound (Q) | 0.2 mg/m$^2$ |
| Third Layer (Interlayer) | |
| Gelatin | 0.4 mg/m$^2$ |
| Formaldehyde | 10 mg/m$^2$ |
| Sodium salt of 2,4-dichloro-6-hydroxy-1,3,5-triazine | 5 mg/m$^2$ |
| Sodium salt of triazine | 5 mg/m$^2$ |
| Bis-vinylsulfonyl methyl ether | 18 g/m$^2$ |
| Active methylene latex (LCX-1) | 0.1 mg/m$^2$ |
| Sodium polyacrylate | 10 mg/m$^2$ |
| Compound (S-1) | 3 mg/m$^2$ |
| Compound (K) | 5 mg/m$^2$ |
| Hardener (B) | 1 mg/m$^2$ |
| Fourth Layer (Protective Layer) | |
| Gelatin | 0.4 mg/m$^2$ |
| Matting agent comprised of polymethyl methacrylate (having an area average particle diameter of 7.0 μm) | 50 mg/m$^2$ |
| Formaldehyde | 10 mg/m$^2$ |
| Sodium salt of 2,4-dichloro-6-hydroxy-1,3,5-triazine | 5 g/m$^2$ |
| Bis-vinylsulfonyl methyl ether | 18 mg/m$^2$ |
| Active methylene latex (LX-1) | 0.2 g/m$^2$ |
| Polyacrylamide (having an average molecular weight of 10,000) | 0.05 g/m$^2$ |
| Sodium polyacrylate | 20 mg/m$^2$ |
| Polysiloxane (S1) | 20 mg/m$^2$ |
| Compound (I) | 12 mg/m$^2$ |
| Compound (J) | 2 mg/m$^2$ |
| Compound (S-1) | 7 mg/m$^2$ |
| Compound (K) | 15 mg/m$^2$ |
| Compound (O) | 50 mg/m$^2$ |
| Compound (S-2) | 5 mg/m$^2$ |
| $C_9F_{19}$—O—$(CH_2CH_2O)_{11}$—H | 3 mg/m$^2$ |
| $C_8F_{17}$—$SO_2N(C_3H_7)$—$(CH_2CH_2O)_{15}$—H | 2 mg/m$^2$ |
| $C_8F_{17}SO_2N)(C_3H_7)$—$(CH_2CH_2O)_4$—$(CH_2)_4SO_3Na$ | 1 mg/m$^2$ |
| Hardener (B) | 1.5 mg/m$^2$ |

(1) Fine solid particle disperse dye (AH)

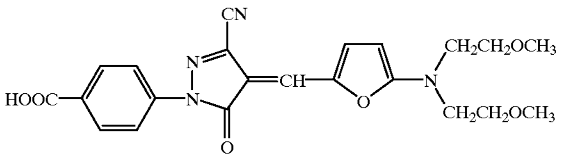

(2) Compound (I)

-continued

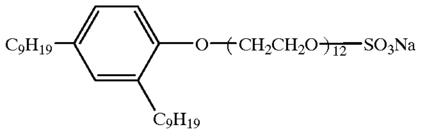

(3) Latex (L)

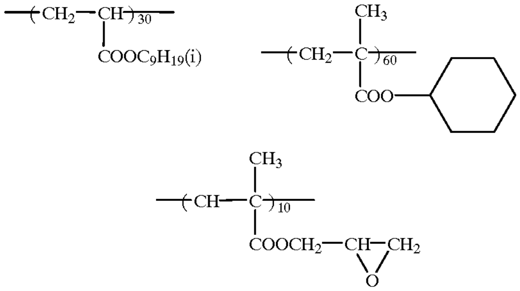

(4) Hardener (A)

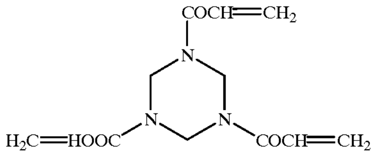

(5) Compound (G)

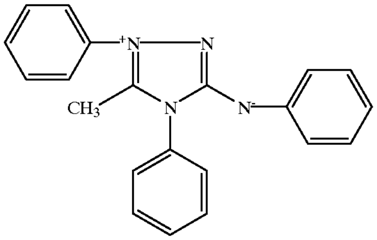

(1) Compound (H)

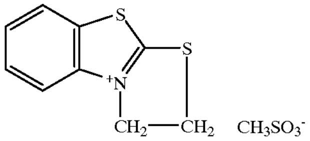

(2) Compound (M)

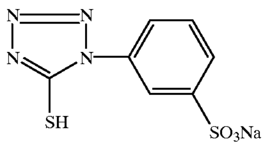

(3) Compound (N)

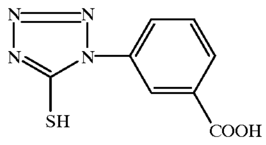

-continued (4) Compound (P)

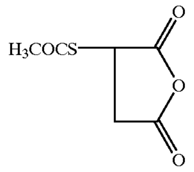

(5) Compound (Q)

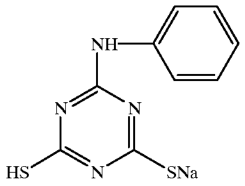

(1) Compound (S-1)

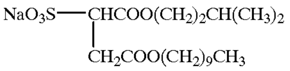

(2) Compound (K)

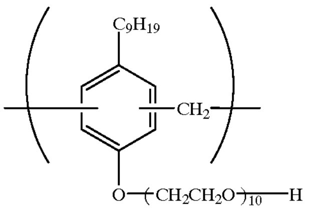

Mixture of n = 2 to 5

(3) Hardener (B)

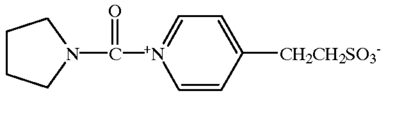

(4) Polysiloxane (S1)

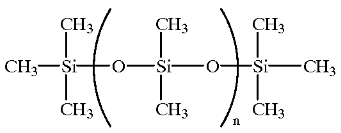

n ≒ 1000

(5) Compound (J)

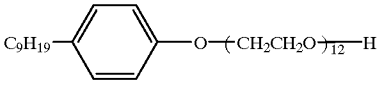

(1) Compound (O)

$C_{11}H_{23}CONH(CH_2CH_2)_5H$ (2) Compound (S-2)

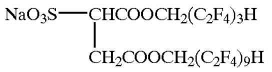

Incidentally, coating weights of components described above refer to those on only one surface of the support.

Each of the silver halide X-ray sensitive photographic materials prepared as described above was covered with a fluorescent screen on both sides, was subjected to X-ray wedge exposure via a Penetrometer Type B (manufactured by Konica Medical Corp.). The exposed material was then subjected to photographic processing at 35° C. for a total processing time of 45 seconds, employing processing solutions which were prepared utilizing solid granular processing agents (manufactured by Konica Corp.) described in paragraphs [0213] through [0220] of Japanese Patent Publication Open to Public Inspection No. 9-319038, as well as utilizing an automatic processor SRX-503 (also manufactured by Konica Corp.). During said processing, the replenishing rate of the processing solution was controlled at 210 ml/$m^2$ for both the developing solution and the fixing solution. Each of the silver halide emulsion layers was evaluated employing the aforementioned test methods. Table 4 shows the results.

TABLE 4

| Sample No. | Sublayer Coating Composition Type | Antistatic Layer Coating Composition Type | Adhesion Properties: Sample after Coating Before Photographic Processing/After Photographic Processing | Adhesion Properties: Sample under Accelerated Aging Before Photographic Processing/After Photographic Processing |
|---|---|---|---|---|
| 22 | u-3 | 1 | A/A | A/A |
| 23 | u-4 | 2 | A/A | A/A |
| 24 | u-5 | 3 | A/A | A/A |
| 25 | u-6 | 4 | A/A | A/A |
| 26 | u-7 | 1 | A/A | A/A |
| 27 | u-8 | 2 | A/A | A/A |
| 28 | u-9 | 3 | A/A | A/A |
| 29 | u-10 | 4 | A/A | A/A |
| 30 | u-11 | 1 | A/A | A/A |
| 31 | u-12 | 2 | A/A | A/A |
| 32 | u-13 | 3 | A/A | A/A |
| 33 | u-3 | 3 | A/A | A/A |
| 34 | u-3 | Comparative 1 | B/C | D/E |
| 35 | u-5 | Comparative 2 | B/C | D/E |
| 36 | u-7 | Comparative 1 | B/C | D/E |
| 37 | u-11 | Comparative 2 | B/C | D/E |
| 38 | u-15 | Comparative 1 | F/F | F/F |

| Sample No. | Abrasion Resistance: Sample after Coating Before Photographic Processing/After Photographic Processing | Abrasion Resistance: Sample under Accelerated Aging Before Photographic Processing/After Photographic Processing | Formation of Static Marks | Formation of Cracking | Remarks |
|---|---|---|---|---|---|
| 22 | A/A | A/A | A | A | Inv. |
| 23 | A/A | A/A | A | A | Inv. |
| 24 | A/A | A/A | A | A | Inv. |
| 25 | A/A | A/A | A | A | Inv. |
| 26 | A/A | A/A | A | A | Inv. |
| 27 | A/A | A/A | A | A | Inv. |
| 28 | A/A | A/A | A | A | Inv. |
| 29 | A/A | A/A | A | A | Inv. |
| 30 | A/A | A/A | A | A | Inv. |
| 31 | A/A | A/A | A | A | Inv. |
| 32 | A/A | A/A | A | A | Inv. |

TABLE 4-continued

| | | | | | |
|---|---|---|---|---|---|
| 33 | A/A | A/A | A | A | Inv. |
| 34 | F/F | F/F | D | F | Comp. |
| 35 | F/F | F/F | E | F | Comp. |
| 36 | F/F | F/F | D | F | Comp. |
| 37 | F/F | F/F | D | F | Comp. |
| 38 | F/F | F/F | D | F | Comp. |

Inv.: Present Invention, Comp." Comparative Example

As can be seen from the evaluation results, the silver halide X-ray sensitive photographic materials of the present invention exhibit excellent adhesive properties as well as excellent abrasion resistance, and result in neither electrostatic marks nor cracking. Contrary to this, Sample Nos. 33, 34, 36, and 37, which comprise antistatic layers other than the present invention as well as comparative sublayers, exhibited insufficient adhesion properties as well as insufficient abrasion resistance, though electrostatic marks were not formed. Further, Comparative Samples 38 through 42, having a comparative antistatic layer, resulted in insufficient quality for all test criteria.

In accordance with an image forming material material comprised of an antistatic layer in which the electrically conductive composition of the present invention is employed and the specified sublayer, it is possible to provide an image forming material which exhibits excellent adhesion properties, abrasion resistance, and antistatic properties, minimizes cracking, and results in easier handling during production.

What is claimed is:

1. An image forming material comprising a support having a sublayer on at least one surface of said support, wherein the image forming material has on the sublayer an antistatic layer comprised of an electrically conductive composition obtained by mixing polymer particles having a functional group on the side chain with a water soluble polymer which reacts with functional group, and subsequently heating the resulting mixture at 50 to 90° C. for minutes to 6 hours, and further has on said antistatic layer a layer comprised of a hydrophilic resin.

2. The image forming material of claim 1, wherein the sublayer comprises a styrene-diolefin based copolymer, a vinylidene chloride based copolymer, a copolymer having an active methylene group, or two types of acryl based polymer latexes in which one polymer has a lower glass transition point (TgL) and the other has a higher glass transition point (TgH) and the difference between said glass transition points is 10 to 80° C.

3. The image forming material of claim 1, wherein the structure of polymer which forms polymer particles having a functional group on the side chain, is represented by Formula (I):

Formula (I)

$$—(A)_x—(B)_y—(C)_y—$$

wherein A represents an ethylenically unsaturated monomer having a functional group which is reactive with water-soluble polymer selected from the group consisting of an active ethylene group, a glycidyl group, a hydroxyl group, a carboxyl group or salts thereof;

B represents a monomer unit that forms a homopolymer having a glass transition point of not more than 35° C. and being insoluble in water;

C represents an ethylenically unsaturated monomer other than A and B; and x, y, and z each represent percent by weight of the polymer satisfying $10 \leqq x \leqq 60$, $5 \leqq y \leqq 90$, and x+y+x=100.

4. The image forming material of claim 3, wherein the monomer represented by B is selected from the group consisting of methyl acrylate, ethyl acrylate, propyl acrylate, n-butyl acrylate, t-butyl acrylate, nonyl acrylate, 2-ethylhexyl acrylate, dodecyl acrylate, n-butyl methacrylate, pentyl methacrylate, n-hexyl methacrylate, n-octyl methacrylate, 2-ethylhexyl methacrylate, i-nonyl methacrylate, n-dodecyl methacrylate, phenethyl methacrylate, methyl maleate, vinyl acetate, vinyl propionate, vinyl butyrate, vinyl valerate, butadiene, isoprene, and chloroprene.

5. The image forming material of claim 4, wherein the monomer represented by B is selected from the group consisting of ethyl acrylate, propyl acrylate, n-butyl acrylate, 2-ethylhexyl acrylate, butadiene, and isoprene.

6. The image forming material of claim 1, wherein the water-soluble polymer is a water-soluble polymer comprising a sulfonic acid group or carboxylic group.

7. The image forming material of claim 1, wherein the water-soluble polymer is represented by Formula (II):

Formula (II)

$$—(D)_a—(E)_b—(F)_c—$$

wherein D represents a repeating unit of an ethylenically unsaturated monomer having a sulfonic acid group on a side chain; E represents a repeating unit of an ethylenically unsaturated monomer having a carboxylic acid group; F represents a repeating unit of an ethylenically unsaturated monomer other than D and E; and a, b, and c each represent percent by weight of each unit, satisfying $10 \leqq a \leqq 90$, $10 \leqq b \leqq 90$, and a+b+c=100.

8. The image forming material of claim 7, wherein D is selected from the group consisting of styrenesulfonic acid, vinylbenzylsulfonic acid, vinylsulfonic acid, acryloyloxymethylsulfonic acid, acryloyloxyethylsulfonic acid, acryloyloxypropylsulfonic acid, methacryloyloxymethylsulfonic acid, methacryloyloxyethylsulfonic acid, methacryloyloxypropylsulfonic acid, 2-acrylamido-2-methylethanesulfonic acid, 2-acrylamido-2-methylpropanesulfonic acid, 2-acrylamido-2-methylbutanesulfonic acid, 2-ethacrylamido-2-methylethnaesulfonic acid, 2-ethacrylamido-2-methylpropanesulfonic acid, 2-ethacrylamido-2-methylbutanesulfonic acid, 2-methacrylamido-2-methylethnaesulfonic acid, 2-methacrylamido-2-methylpropanesulfonic acid, and 2-methacrylamido-2-methylbutanesulfonic acid, and their salt of alkaline metal ion ammonium ions.

9. The image forming material of claim 7, wherein D is styrenesulfonic acid, butadiene having a sulfonic acid at the 4-position, and butadiene having a methyl group at the 3-position and a sulfonic group at the 4-position, and their salts.

10. The image forming material of claim 7, wherein E is selected from the group consisting of acrylic acid, methacrylic acid, itaconic acid, maleic acid, and their salts of alkaline metal ion or ammonium ion.

11. The image forming material of claim 4, wherein the water-soluble polymer is represented by Formula (II):

Formula (II)

$$—(D)_a—(E)_b—(F)_c—$$

wherein D represents a repeating unit of an ethylenically unsaturated monomer having a sulfonic acid group on a side chain; E represents a repeating unit of an ethylenically unsaturated monomer having a carboxylic acid group; F represents a repeating unit of an ethylenically unsaturated monomer other than D and E; and a, b, and c each represent percent by weight of each unit, satisfying $10 \leqq a \leqq 90$, $10 \leqq b \leqq 90$, and a+b+c=100.

12. The image forming material of claim 11, wherein in Formula (I) the monomer represented by B is selected from the group consisting of ethyl acrylate, propyl acrylate, n-butyl acrylate, 2-ethylhexyl acrylate, butadiene, and isoprene; and x and y satisfies $50 \leqq x+y \leqq 100$; in Formula (II) D is styrenesulfonic acid, butadiene having a sulfonic acid at the 4-position, and butadiene having a methyl group at the 3-position and a sulfonic group at the 4-position, and their salts; and E is selected from the group consisting of acrylic acid, methacrylic acid, itaconic acid, maleic acid, and their salts of alkaline metal ion or ammonium ion; and a, b and c satisfies $10 \leqq a \leqq 90$, $10 \leqq b \leqq 90$, and a+b+c=100.

13. The image forming material of claim 1 wherein the water-soluble polymer is mixed with the polymer particles in a ratio of 0.1 to 10 times in terms of weight ratio of solid component.

14. The image forming material of claim 13 wherein an average particle diameter of the polymer particles having the functional group is between 0.03 and 10 μm.

15. The image forming material of claim 1 wherein the hydrophilic layer comprises silver halide grains.

16. The image forming material of claim 12 wherein the electrically conductive composition is obtained by thermally processing polymer particles having a functional group on the side chain with a water soluble polymer which reacts with the functional group with mixing at 50 to 90° C. for 10 minutes to 6 hours.

17. The image forming material of claim 16 wherein ratio of the water-soluble polymer is mixed with the polymer particles of 0.1 to 10 in terms of weight ratio of solid component.

* * * * *